US008504410B2

(12) United States Patent
Pasta

(10) Patent No.: US 8,504,410 B2
(45) Date of Patent: *Aug. 6, 2013

(54) METHOD FOR IMPROVING CUSTOMER SURVEY SYSTEM

(76) Inventor: Poorya Pasta, Tehran (IR)

( * ) Notice: Subject to any disclaimer, the term of this patent is extended or adjusted under 35 U.S.C. 154(b) by 0 days.

This patent is subject to a terminal disclaimer.

(21) Appl. No.: 13/171,440

(22) Filed: Jun. 28, 2011

(65) Prior Publication Data

US 2011/0258137 A1   Oct. 20, 2011

Related U.S. Application Data

(63) Continuation-in-part of application No. 11/681,446, filed on Mar. 2, 2007, now Pat. No. 7,996,252.

(51) Int. Cl.
*G06Q 10/00* (2012.01)

(52) U.S. Cl.
USPC ....... 705/7.32; 705/7.33; 705/7.34; 705/7.35; 705/7.11; 705/7.29; 705/14.34; 705/14.36; 705/14.37; 705/14.38; 705/14.44; 705/14.57; 705/14.58; 705/14.65; 705/14.66; 705/14.27; 705/14.3

(58) Field of Classification Search
None
See application file for complete search history.

(56) References Cited

U.S. PATENT DOCUMENTS

| | | | | |
|---|---|---|---|---|
| 4,345,315 A | * | 8/1982 | Cadotte et al. | 705/7.32 |
| 5,038,367 A | * | 8/1991 | Casey et al. | 377/13 |
| 5,392,095 A | * | 2/1995 | Siegel | 399/8 |
| 5,704,029 A | * | 12/1997 | Wright, Jr. | 715/223 |
| 5,822,744 A | * | 10/1998 | Kesel | 706/52 |
| 5,913,204 A | * | 6/1999 | Kelly | 705/500 |
| 5,950,172 A | * | 9/1999 | Klingman | 705/27.1 |
| 6,026,387 A | * | 2/2000 | Kesel | 706/52 |
| 6,102,287 A | * | 8/2000 | Matyas, Jr. | 235/380 |
| 6,380,928 B1 | * | 4/2002 | Todd | 345/169 |
| 6,456,981 B1 | * | 9/2002 | Dejaeger et al. | 705/14.38 |
| 6,574,614 B1 | * | 6/2003 | Kesel | 706/52 |
| 6,934,684 B2 | * | 8/2005 | Alpdemir et al. | 704/265 |
| 6,960,988 B2 | * | 11/2005 | Blink et al. | 340/286.09 |
| 6,963,848 B1 | * | 11/2005 | Brinkerhoff | 705/7.32 |
| 6,970,831 B1 | * | 11/2005 | Anderson et al. | 705/7.32 |
| 6,980,962 B1 | * | 12/2005 | Arganbright et al. | 705/14.31 |
| 7,013,290 B2 | * | 3/2006 | Ananian | 705/26.42 |
| 7,363,214 B2 | * | 4/2008 | Musgrove et al. | 704/9 |
| 7,376,570 B2 | * | 5/2008 | Sone | 705/1.1 |
| 7,483,844 B2 | * | 1/2009 | Takakura et al. | 705/26.7 |
| 7,778,884 B2 | * | 8/2010 | Bamborough et al. | 705/14.36 |
| 7,856,377 B2 | * | 12/2010 | Cohagan et al. | 705/14.3 |
| 2001/0032115 A1 | * | 10/2001 | Goldstein | 705/10 |
| 2001/0037206 A1 | * | 11/2001 | Falk et al. | 705/1 |
| 2002/0026348 A1 | * | 2/2002 | Fowler et al. | 705/10 |
| 2003/0028451 A1 | * | 2/2003 | Ananian | 705/27 |

(Continued)

*Primary Examiner* — Lynda Jasmin
*Assistant Examiner* — Brett Feeney
(74) *Attorney, Agent, or Firm* — Barry Choobin; Choobin & Choobin Consultancy L.L.C

(57) ABSTRACT

A global customer satisfaction system includes point-of-sale customer feedback terminals for receiving in-store customer feedback including satisfaction ratings and other customer feedback regarding participating vendors as the customer pays for purchases. The system also includes post-sale customer feedback terminals for receiving more detailed customer feedback regarding the vendors from members after the sales have been completed. The system also includes an aggregation and dissemination system for combining the ratings received form customers into global customer satisfaction ratings for participating vendors, and disseminating the customer satisfaction information through customer satisfaction qualified directories, which are organized or searchable by geographical, type of product or service offered by the participating vendors, and other factors.

1 Claim, 9 Drawing Sheets

U.S. PATENT DOCUMENTS

| | | | |
|---|---|---|---|
| 2003/0055723 A1* | 3/2003 | English | 705/14 |
| 2004/0006478 A1* | 1/2004 | Alpdemir et al. | 704/275 |
| 2004/0078214 A1* | 4/2004 | Speiser et al. | 705/1 |
| 2004/0102982 A1* | 5/2004 | Reid et al. | 705/1 |
| 2004/0235460 A1* | 11/2004 | Engstrom et al. | 455/414.1 |
| 2004/0243468 A1* | 12/2004 | Cohagan et al. | 705/14 |
| 2005/0043992 A1* | 2/2005 | Cohagan et al. | 705/14 |
| 2005/0091038 A1* | 4/2005 | Yi et al. | 704/10 |
| 2005/0197988 A1* | 9/2005 | Bublitz | 706/46 |
| 2005/0203800 A1* | 9/2005 | Sweeney et al. | 705/14 |
| 2006/0095331 A1* | 5/2006 | O'Malley et al. | 705/22 |
| 2006/0235764 A1* | 10/2006 | Bamborough et al. | 705/26 |
| 2007/0143122 A1* | 6/2007 | Holloway et al. | 705/1 |
| 2007/0192206 A1* | 8/2007 | Manesh et al. | 705/26 |
| 2007/0199014 A1* | 8/2007 | Clark et al. | 725/30 |

* cited by examiner

METHOD FOR IMPROVING CUSTOMER SURVEY SYSTEM

REFERENCE TO RELATED APPLICATION

This application is Continuation in Part of U.S. patent application Ser. No. 11/681,446 filed Mar. 2, 2007 now U.S. Pat. No. 7,996,252.

TECHNICAL FIELD

The present invention pertains to the fields of vendor directories and customer satisfaction rating systems and, more particularly, to a system for receiving customer satisfaction ratings for participating vendors at points of sale and following the completion of sales, aggregating the ratings received form customers into ratings for participating vendors, and providing a customer satisfaction qualified vendor directory indicating the x customer satisfaction ratings for the participating vendors.

BACKGROUND

Systems for providing informed opinions regarding products and services have been in use for many years. For example, Consumer Reports® publishes a guide in which comparable models of products are rated by experts who conduct appropriate research. The results are typically compiled and presented in the form of consumer reports that are organized or searchable by product showing the various competitive models and indicating ratings such as "star ratings" assigned to the various models by the researchers. A wide variety of product and service reviews are currently available, typically organized into guides comparing and rating particular categories of products or services. For example, one can find automotive guides comparing and rating automobiles, movie guides comparing and rating movies, hotel guides comparing and rating hotels, restaurant guides comparing and rating restaurants, and the like.

With the increasing popularity of online shopping, major online sales organizations have also developed systems for receiving and publishing customer feedback regarding particular sellers as a way to provide purchasers with information regarding experience that prior shoppers have had with the vendors. Google® and Amazon®, for example, provide online shopping customer feedback systems that have become quite sophisticated. These systems typically employ a rating system, such as "star ratings" applicable to particular vendors, and also provide users with access to individual customer comments, product or service reviews, critiques of product or service reviews, and other information. In general, these systems are useful for informing the online shopping community about particular products, service and vendors, including disseminating customer feedback and to potential purchasers about superior and sub-standard performers.

Vendor directories organized by product or service categories have also been in use for many years. These directories are often organized or searchable by geographical area, and for each geographic area are further organized into categories of products and services. The most prominent examples are the "Yellow Page" directories, which are typically published annually on a community-by-community basis. As another example, Thomas Register® publishes technical directories of vendors for industrial products and services organized by category of product or service. Many variations of these types of vendor directories have been developed over the years and can currently be found both in print and online formats. Records of complaints and other customer feedback information are also made available for individual vendors, for example through the Better Business Bureaus.

Although there are a variety of vendor information systems, product and service rating systems, customer feedback systems, and vendor directories available today, these resources are typically provided separately. As a result, a potential purchaser researching a major purchase may consult with a variety of these resources to become well informed about the choices available. For example, the customer may first conduct research into the available product models using product guides. Having found a specific model of the desired product, the customer may then do some comparative shopping using a Yellow Page vendor directory to find a local or online vendor offering the product at an attractive price. Having found a particular vendor selling the desired model at an attractive price, the careful shopper may check the Better Business Bureau or other available resources or reviews regarding that particular vendor.

While there is a great deal of information available to assist the shopper, accessing and navigating through that information can be tedious and time consuming. In addition, the time needed to make a comprehensive investigation into a particular product or service increases as the amount of available information increases. Of course, specific reviews, ratings and customer feedback statements can be biased, contradictory or even falsified. With the proliferation of free and subscription based information available in print and online, and with the proliferation of advertisements, vendors, websites and blogs, culling through all of the available information and determining which sources are most reliable information can be a substantial challenge.

This situation presents potential customers with challenges as they attempt to wade through all of the available information regarding a prospective purchase, which may be impractical for all but relatively significant purchases. This situation also presents reputable vendors with substantial communication challenges, as they seek cost effective ways to communicate with potential customers in the increasingly cluttered environment of modern communication and advertisement systems.

As a result, there is an ongoing need for cost effective systems to help customers conduct comparative shopping and find reputable vendors, and for reputable vendors to provide relevant information to potential customers.

SUMMARY OF THE INVENTION

The present invention solves these problems in a system known as the System that creates and provides a network of subscribers and vendors with access to a customer satisfaction qualified vendor directory. At a basic level, the customer satisfaction qualified vendor directory is similar to a conventional Yellow Page vendor directory system that includes participating vendors organized by geographical area and categories of products and services, except that each vendor listing also includes a x customer satisfaction rating. Additional "deep links" may also be provided for accessing maps, customer reviews, vendor statements, coupons, advertisements, and so forth.

The system includes point-of-sale customer feedback terminals for receiving in-store customer feedback including satisfaction ratings and other customer feedback regarding participating vendors as the customers pay for purchases. The system also includes post-sale customer feedback terminals for receiving more detailed customer feedback regarding the vendors from customers after the sales have been completed.

The system also includes an aggregation and dissemination system for combining the ratings received form customers into x customer satisfaction ratings for participating vendors, and disseminating the customer satisfaction information through customer satisfaction qualified directories, which are organized or searchable by geography and type of product or service offered by the participating vendors.

Generally described, the invention may be practiced as a customer satisfaction system that includes a number of customer satisfaction rating terminals that receive customer satisfaction feedback from customers related to vendors. The system also includes a customer satisfaction aggregation system that receives the customer satisfaction feedback from the customer satisfaction rating terminals and consolidates the customer satisfaction feedback to provide a customer satisfaction rating associated with each vendor. The system further includes a customer satisfaction dissemination system that provides access to a customer satisfaction qualified vendor directory system. The directory contains a listing of vendor entries, in which each vendor entry contains contact information and the customer satisfaction rating determined by the customer satisfaction aggregation system for the associated vendor. The customer satisfaction qualified vendor directory is also organized or searchable by geographic location of the vendors, and for each geographic location contains vendor entries organized or searchable by category of product or service offered by the vendors.

The customer satisfaction rating terminals typically include a number of point-of-sale terminals located at vendor store locations. Each point-of-sale terminal is associated with a particular vendor, located on the premises of the vendor in association with a purchase check out station where customers pay for purchased items. Each terminal is operable to receive customer satisfaction feedback while the customers are located at the check out station. For example, the point-of-sale terminals may be incorporated into financial card reader stations that are operable for reading financial cards and for receiving customer satisfaction feedback. The customer satisfaction rating terminals may also include a number of post-sale terminals, wherein each post-sale terminal is configured to provide post-sale customer feedback through online communication with the customer satisfaction aggregation system. In particular, any computer with an Internet connection may be used to contact a server operated by the customer satisfaction system and provide post-sale customer feedback.

Optionally, the customer satisfaction system may also include a member reward system that issues rewards to customers who have registered as members of the customer satisfaction system, and who enter customer feedback into the customer satisfaction rating terminals. For example, the rewards may include purchase price discounts, rebates, deposits to savings accounts, points in a points-based rewards program, or another suitable reward program.

The customer satisfaction dissemination system may utilize printed customer satisfaction qualified vendor directories published for various geographic locations. As a more convenient option for many situations, the customer satisfaction qualified vendor directory may be made available to registered members through an online server that provides electronic access to the customer satisfaction qualified vendor directory through a search engine. In this case, the directory is accessed through a menu-driven user interface for the search engine that locates vendor entries organized through a hierarchy of geographic areas, product and service categories, and other factors. The vendor entries may also include hypertext links to additional information, such as maps, customer reviews, coupons, advertisements, and so forth.

It should also be understood that many other advantages and alternatives for practicing the invention will become apparent from the following detailed description of the preferred embodiments and the appended drawings.

BRIEF DESCRIPTIONS OF THE DRAWINGS

DETAILED DESCRIPTION OF INVENTION

Figure 1:
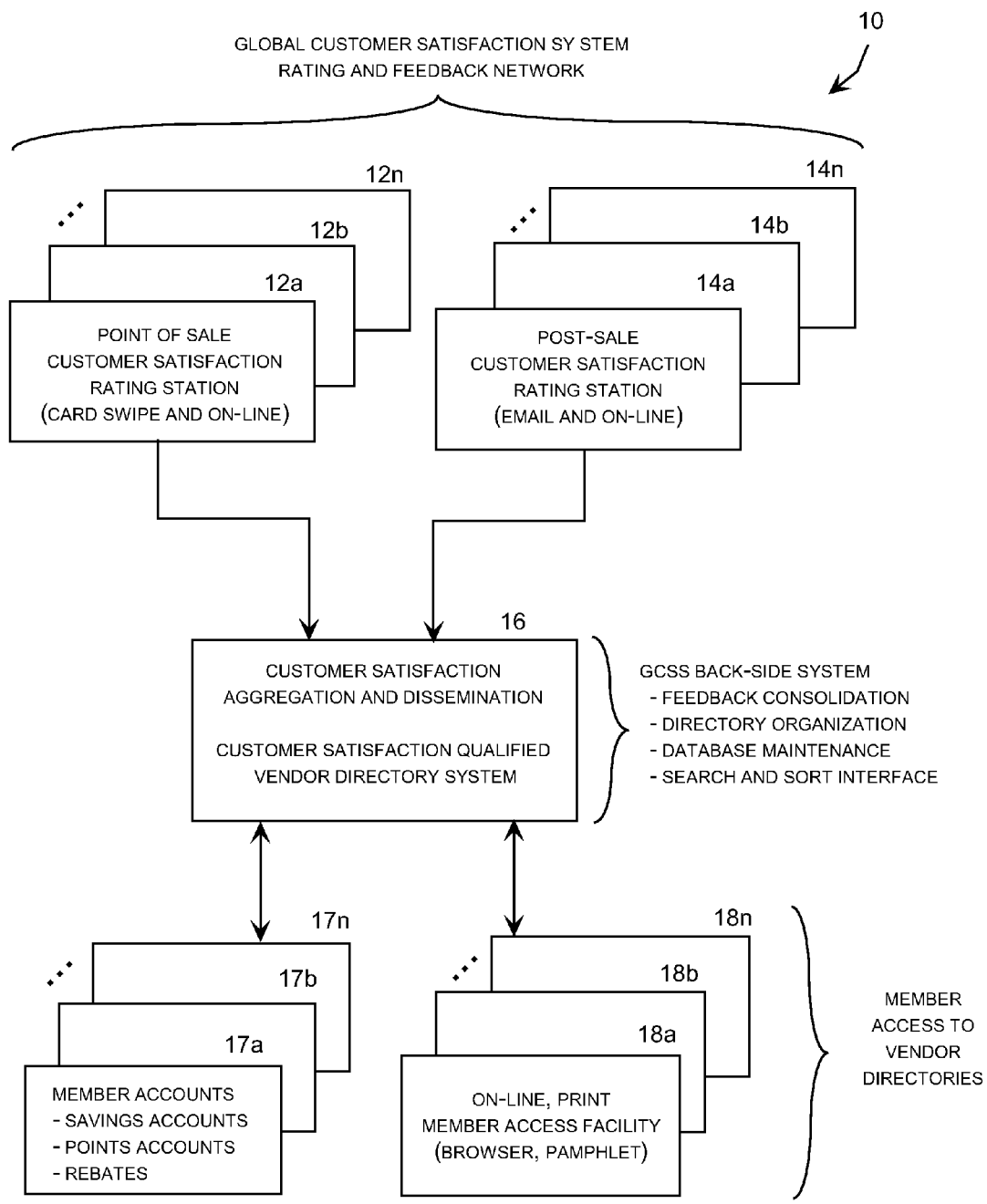
FIG. 1 is conceptual block diagram of a system.

The present invention may be embodied as a System (X system or network) in which members (X customers or purchasers) have the ability to provide instant customer satisfaction ratings applicable to participating vendors (X vendors or sellers) at point-of-sale terminals (X terminals). These customer satisfaction ratings are compiled and published as a composite customer satisfaction indicator (X rating) within one or more customer service qualified vendor directories (X directories), thus providing other members with the ability to preview the aggregate ratings given to any participating X vendor prior to making any purchase. The X directories can be published in print for particular geographic areas or product or service categories. The most effective customer tool for most situations is a searchable, online x vendor directory (X x directory) with a user-friendly interface that allows X customers to easily conduct searches within selected geographic areas, product and service categories, price ranges, and other criteria. In addition to the X rating that provides consolidated customer feedback information at a glance, the x directory also provides "deep links" to more detailed resources, such as customer reviews, professional reviews, critiques of reviews, product catalogs, detailed product specifications, price lists, statements from the vendors, advertisements, comparative listings, maps, and a wide range of other information that they system designers, members, vendors and other users elect to incorporate into the database.

As an organization tool for a wide range of information sources, the X directory is designed, and is expected to further develop over time, to be a robust customer satisfaction database accessed through the X directories. By organizing the customer feedback and other information under a vendor directory system organized by geographic area and product and service categories, the X system can be easily accessed by X members when shopping for many different kinds of products or services in many different locations.

In addition to providing user feedback stations at point-of-sale locations, the X system also allows members to provide post-sale detailed feedback in the form of ratings and commentary. The system also provides the member with the ability to search for X participating vendors based on ratings aggregated into the system and also based on the amount of discount given by the participating vendor to members of the network. These searches can be done online using the system's website or on the system's mobile application created for cellular phones. Ratings, discounts and listings of participating vendors can also be found in hard-copy X vendor directories published regularly by the operators of the X network.

X ratings given at the point of sales typically include a x rating on a scale of one to five for easy completion by the member at the point of sale. The customer feedback station provided at the point-of-sale may also accept more detailed feedback in the form of responses to customer satisfaction related questions in a rating or multiple choice format, such as price satisfaction, checkout time, availability of parking, safety and security, cleanliness of store, variety of selection, shopping experience, and other parameters that can be easily entered at the point of sale. The member may alternatively enter this level of feedback information through a post-sale terminal. In addition, more detailed feedback, such as specific comments, detailed reviews, and so forth are typically entered through the post-sale review, which is typically entered online or through email. The x rating and any other feedback entered at the point of sale is typically entered into the same card-swipe terminal that is used to process the customer's payment. Additional and usually more detailed post-sale feedback can also be entered online concerning factors such as fairness of price, quality of goods and services, after-sales services (warranty, guarantee, etc), written reviews, reviews of reviews, and any other type of suitable feedback.

The X network also provides for the implementation of discounts and other rewards offered by participating vendors to X members. The rewards can be provided in the form of price reductions implemented at the point of sale, rebates, deposits into savings accounts, points systems, or any other suitable reward system. Member discounts may be optional or mandatory, and may be applied to all members on a level basis, may be weighted, and may be used to reward specific factors. For example, members may earn a reward by entering the point-of-sale feedback, entering the post-sale feedback, transacting a certain amount of business within the X network, maintaining a financial account associated with the X network, or other factors. Member discounts may also made available or increased based on other factors, such as the amount of business transacted in the X network, the length of membership, whether the member is also a participating vendor, the amount of business a member-vendor transacts in the X network, the amount of discount that a member-vendor offers to other members, whether the member regularly provides point-of-sale feedback, whether the member regularly provides post-sale feedback; whether the member's reviews are well received in the X network, and so forth.

The participating vendors in the X network is suitable to cover all sectors of retail and wholesale industrial sectors, manufacturers, commercial entities, and service providers, both within the public and private sectors. The potentially x extent of the X system and its all-inclusive nature demonstrate the uniquely wide scope of this x network, which constitutes an important characteristic of the X network. The xization process and major developments in information and communication technologies on the one hand, and the rising demands of the value-conscious customers on the other hand, provides fertile ground for development of the X network in a manner and scope that has the potential to drastically improve over the current state of retail business standards. The main objective of the X network is to provide a system for monitoring and communicating customer satisfaction as expressed by past customer to prospective future customers, so as to reward reputable and high quality vendors with X member good will, as reflected in the customer service information made available to the members though the X vendor directories. The end result of the X network is to strongly improve, and even evolve to a higher stage, the existing retail business standards.

In the current retail sales environment, product and service providers are not required to accept or publish customer satisfaction ratings or other feedback despite the fact that such ratings could improve the quality of goods and services. Of course, those vendors experiencing high levels of customer satisfaction would welcome a low cost ability to receive and disseminate this type of information to their prospective customers, while those vendors experiencing lower levels of customer satisfaction would be less willing to provide this information to prospective customers. The X network provides a mechanism for expression of the degree of customer satisfaction both at the point of sale, typically through entry of a single x rating or a very brief list of rating items concerning the general level of performance, and post-sale, typically allowing more detailed feedback concerning fairness of the price, quality of received goods and services, post-sale activities such as warranty or return issues, detailed product or vendor reviews, and the like.

This mechanism acts to reward superior vendor performance and penalize inferior vendor performance through the communication of customer satisfaction information entered by past customers to potential future purchasers, and thereby serves the interests both sides of the transactions who seek good faith and superior performance. It serves the interests of the customer by providing readily available customer satisfaction information and the possibility of receiving discounts on the prices of goods and service—either as a direct discount paid at the point of sale or as a deposit to the customer's saving account—and also provides to the customer a possibility to rate the performance of vendors both at the point of sale and after the point of sale. The system also serves the interests of those vendors who wish to increase their customer base by consistently providing superior goods and services, as recognized by consumers and communicated to others through the X network.

The X system includes a network of participating vendors and consumer-members who form a customer base for the participating vendors. The objective of the X network is to connect participating vendors with consumer-members, where consumer-members provide customer satisfaction related feedback, upon purchase and later regarding after-sales services. The members may also receive a predetermined discount or other reward from the participating vendors. In a typical implementation of the X system at the point-of-sale location, the member swipes his/her membership card or provides his/her member-id/password (e.g., for online services) and is authenticated by the system. The member then enters customer service satisfaction information and, in cases where member discounts are offered, receives a predetermined discount, rebate or point award based on the sum-total of the purchase. The specific discounts or other rewards offered by a vendor are typically determined under a X participation agreement between the X system operator and the participating vendor.

The point-of-sale customer satisfaction information is typically received in the form of a x customer satisfaction rating, and may also include a short list of ratings or multiple choice question electronically displayed on a terminal at the point of sale. In particular, the questions may be displayed on the card-reader/keypad that is used to read the customer's magnetic X membership card, and the user responds by selecting a rating or a response from a multiple choice question to which the customer responds by punching in a number using the keypad on the terminal. In electronic points of sales, such as online stores, the user sees the discounted total of the purchases made on the website and a customer-service related question on the same page, and the user responds by selecting one of the provided responses. The discount provided by the participating vendor and the customer feedback question/response may be voluntary feature or a requirements for vendor participation in the X system.

The X system may also include in-store customer feedback stations from which user rates listed items or answers multiple choice questions, such as a card-reader/keypad combo that first recognizes the user at the point of sales from the data written onto the magnetic card. Customer satisfaction and the customer's shopping details are transmitted from the input mechanisms to the X database; where the ratings given concerning a participating vendor are aggregated into existing ratings and the customer's shopping details may be recorded in a database that provides the customer with access to details regarding the customer's shopping history. Users of the X system will be able to find participating vendors and the aggregate of the ratings given to any participating vendor through print or online access to customer satisfaction qualified vendor directories. Individual customers have the ability to view their shopping histories and the savings made through X on the section of the X site that is dedicated to the customer's shopping history.

Turning now to the figures, in which like numerals refer to like elements throughout the several figures, a particular embodiment of the invention will be described with reference to the figures. Although the customer satisfaction system can be implement in a wide variety of ways with many areas of sophistication, the figures show a simple example for the purpose of illustrating the principles of the invention. In practice, many different types of customer satisfaction systems with different features and levels of sophistication may be implemented, and the features implemented by these systems may vary for different types of vendors and members. FIG. 1 is conceptual block diagram of a system 10. The system includes a number of point-of sale customer feedback stations 12a-n. Some of these rating systems may be specifically designed for in-store locations, and other may be configure for online shopping. For both types of stations, the point-of sale customer feedback stations 12a-n are configured to receive customer feedback in the form of customer satisfaction ratings that can be quickly entered at the time that the customer pays for a purchase. Typically, the point-of sale customer feedback stations utilize a simple "1 through 5" or similar ranking system that allows the customer to enter the satisfaction rating quickly as the customer completes the purchase check-out process. The point-of sale customer feedback may also allow the user to enter additional structured feedback, such as ratings for a list of specific items ore multiple choice answers to a list of specific questions. Specific examples are described further with reference to FIGS. 2-4.

The system 10 also includes a number of post-sale customer feedback stations 14a-n, which are typically configured for allowing customers to enter more detailed feedback after the purchase has been completed, when time pressures of completing a purchase are not present. In particular, any computer with an internet connection can be used an a post-sale customer feedback station whenever the customer would like to enter the feedback. Typically, a X vendor number printed on a sales receipt or the participating vendor's name will be all that the user needs to know to locate the correct vendor the online X directory to enter a variety of types of customer feedback. Customers can use the post-sale customer feedback stations to enter feedback that is not yet available or too time consuming to enter at the point of sale, such as detailed statements regarding their shopping experience and any product support, return or warranty issues that occurred after the sale. The members can also enter product reviews, vendor reviews, critiques of reviews, and so forth. The objective using two types of customer feedback stations is to have point-of-sale customer feedback stations 12a-n that all or most members are prompted to use very quickly to entered structured form feedback as purchases are completed, and post-sale customer feedback stations 14a-n available for that those customers who which to make more detailed, non-structured form commentary when time permits. A specific example of a post-sale feedback terminal is described further with reference to FIG. 5.

The system 10 also includes a customer feedback aggregation and dissemination system 16, which is typically configured as an Internet server system. This system aggregates the feedback received from various customers into a consolidated customer satisfaction ranking, typically on a scale from one to five, for each participating vendor in the network. For example, the ratings entered by customers can be aggregated by averaging or weighted averaging taking certain factors into account in the weighting factors. For example, more recent ratings may be given more weight that older ratings, ratings from higher volume shoppers may be given more weight that ratings from lower volume shoppers, ratings from members who have been registered in the network longer may be given more weight than rating from more recent members, and so forth. Many different techniques can be used to combine and normalize the customer ratings received for a particular vendor into an aggregate or xrating, and different aggregation algorithms may be used for different product or service categories.

The customer feedback aggregation and dissemination system 16 also makes the customer satisfaction information to members of the network. Specifically, customer satisfaction information is disseminated to the members though a customer satisfaction qualified vendor directory. This is similar to a traditional yellow page directory, except that it typically covers multiple geographic areas, and that each vendor entry includes customer satisfaction feedback information, such as a x X rating. In particular, the customer satisfaction feedback information typically includes at least the aggregate or x rating determined by the X system from member feedback, typically expressed on a scale of one to five, and a number of "deep links" to more detailed customer feedback information. Accordingly, the x X rating for a particular vendor will be a dynamic figure that can change over time as new customer feedback is entered into the customer feedback aggregation and dissemination system 16 and older feedback ages becomes less relevant.

The system 10 also includes a system of member accounts 17*a*-*n* for its members. The member accounts allow members to register, input and change contact information, obtain vendor directories, enter post-sale feedback, and so forth. Each member account may include a reward system for providing the member with an incentive for using the X network. As a first example, the member may receive a discount on the price of goods or services applied at the point of sale. As another example, the member may receive a rebate deposited into a savings account maintained by the operator of the X network. A points systems may also be used as another example. Different members may receive different levels of rewards, for example based on the amount of business they do through the network, the length of time they have been a member in the system, whether they provide customer service feedback, whether they are a vendor participating in the network, and other factors.

The customer satisfaction qualified vendor directory can be published in printed form for a variety of geographic locations, and a more convenient dissemination mechanism is the online directory accessed through a search engine with a menu-driven user interface. In general, the members access the customer satisfaction qualified vendor directories 18*a*-*n* through printed or online access, as desired to support their shopping needs. A specific example of an online customer satisfaction qualified vendor directory is described further with reference to FIGS. 6-10.

Figure 2:
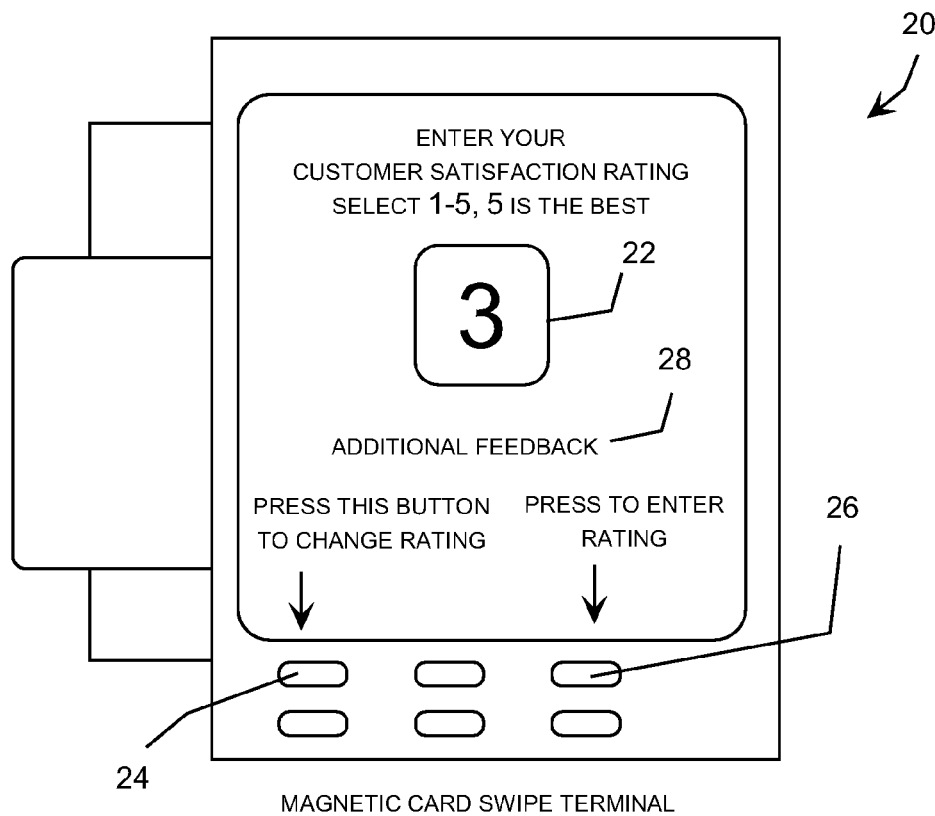
FIG. 2 is a conceptual illustration of a point-of-sale customer satisfaction terminal integrated with a financial card processing terminal configured for in-store sales.
Figure 3:
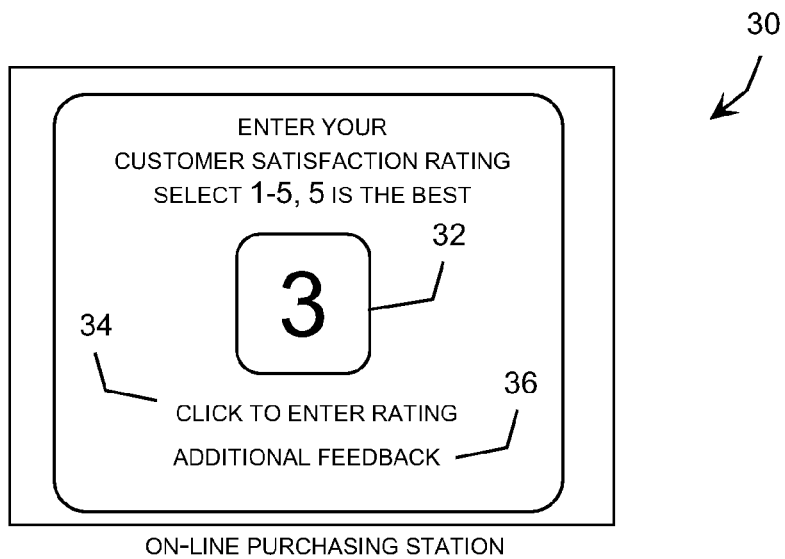
FIG. 3 is a conceptual illustration of a point-of-sale customer satisfaction terminal configured for online sales.
Figure 4:
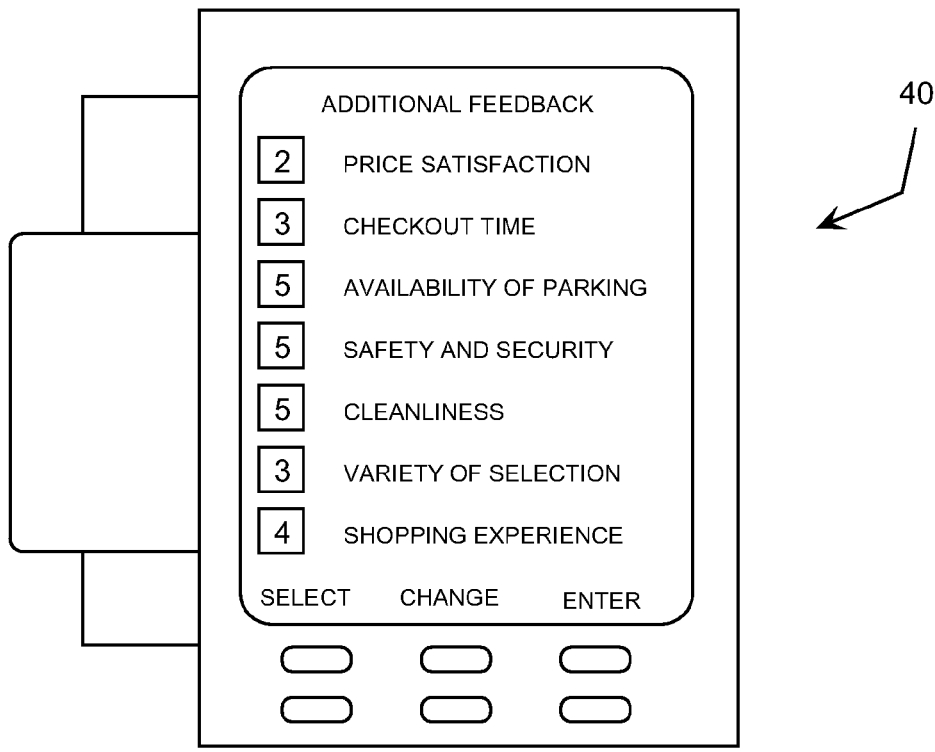
FIG. 4 is a conceptual illustration of the point-of-sale customer satisfaction terminal displaying an set of customer feedback questions.

FIG. 2 is a conceptual illustration one type of customer feedback station, in this example a point-of-sale customer satisfaction terminal 20 integrated with a financial card processing terminal configured to process customer payments for in-store sales. To receive customer feedback quickly and easily as the customer pays for a purchase, the point-of-sale customer satisfaction terminal preferably enables the user to enter a single x rating on a scale from one to five. The rating is displayed in a window 22, and the customer toggles a first button 24 to change the rating and a second button 26 to enter the rating. The point-of-sale customer satisfaction terminal may also have a mechanism, such as a touch-screen field 28 that the customer can touch with a finger or stylus, to access an additional screen for entering customer feedback information. An example of a additional screen for entering customer feedback information is shown in FIG. 4 FIG. 3 is a conceptual illustration of a point-of-sale customer satisfaction terminal 30 configured for online sales. This visible interface similar to the customer satisfaction terminal 20 used for in-store sales, except that it is suitable for displayed on a computer screen as the customer goes through the online shopping check out process. In this example, the user interface includes a window 30 where the customer enters the desired rating, a button or field where the user clicks to enter the rating, and a button or field where the user clicks to access an additional customer feedback panel. The point-of-sale customer satisfaction terminal should be intuitively easy to understand at a glance and very quick and easy to use. Although may different options could be implemented for this function, the example illustrated meets these basic objectives while still allowing the customer to enter meaningful feedback information very quickly.

FIG. 4 is a conceptual illustration of the point-of-sale customer satisfaction terminal displaying a set of customer feedback rating items 40. In this example, the terminal displays a number items that the customer can rate individually on a scale from one to five. In this particular illustration, the user can use three of the buttons on the terminal to select among the items, toggle through the available ratings, and enter the feedback. For example, the customer can enter a separate rating for "price satisfaction," "checkout time," "availability of parking," "safety and security," "cleanliness," "variety of selection," and "shopping experience." Of course, other types of questions such as multiple choice could be displayed, additional user feedback panels could be implemented, and the specific items inquired about on the panel is a matter of design choice and may be different for different types of stores.

Figure 5:
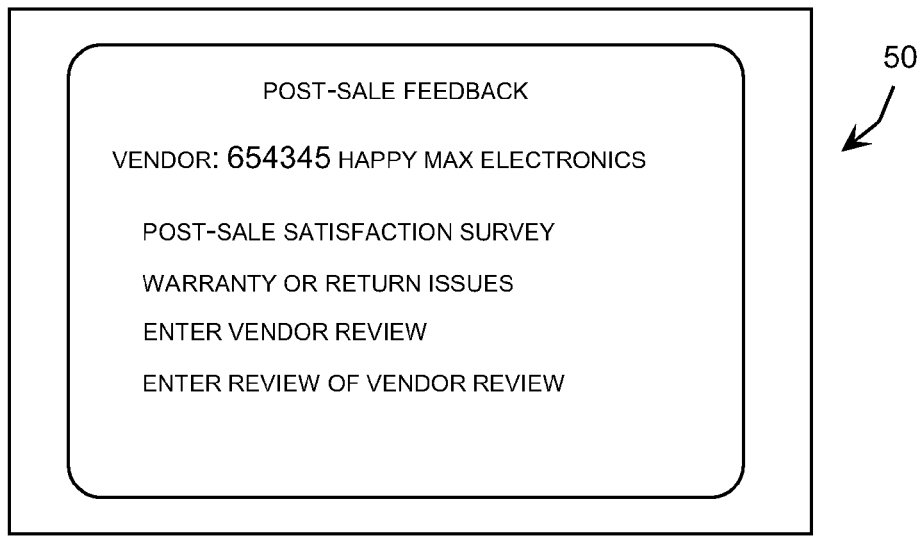
FIG. 5 is a conceptual illustration of a post-sale customer satisfaction terminal.

FIG. 5 is a conceptual illustration of a post-sale customer satisfaction terminal 50. This is a simple example that allows the member to identify a specific vendor, for example by entering a vendor X number, vendor name, or linking to the post-sale feedback from a vendor entry. Many different options may be used for receiving post-sale feedback including unstructured formats, such as textual reviews written by customers, critiques of reviews, and other types of detailed feedback.

Figure 6:
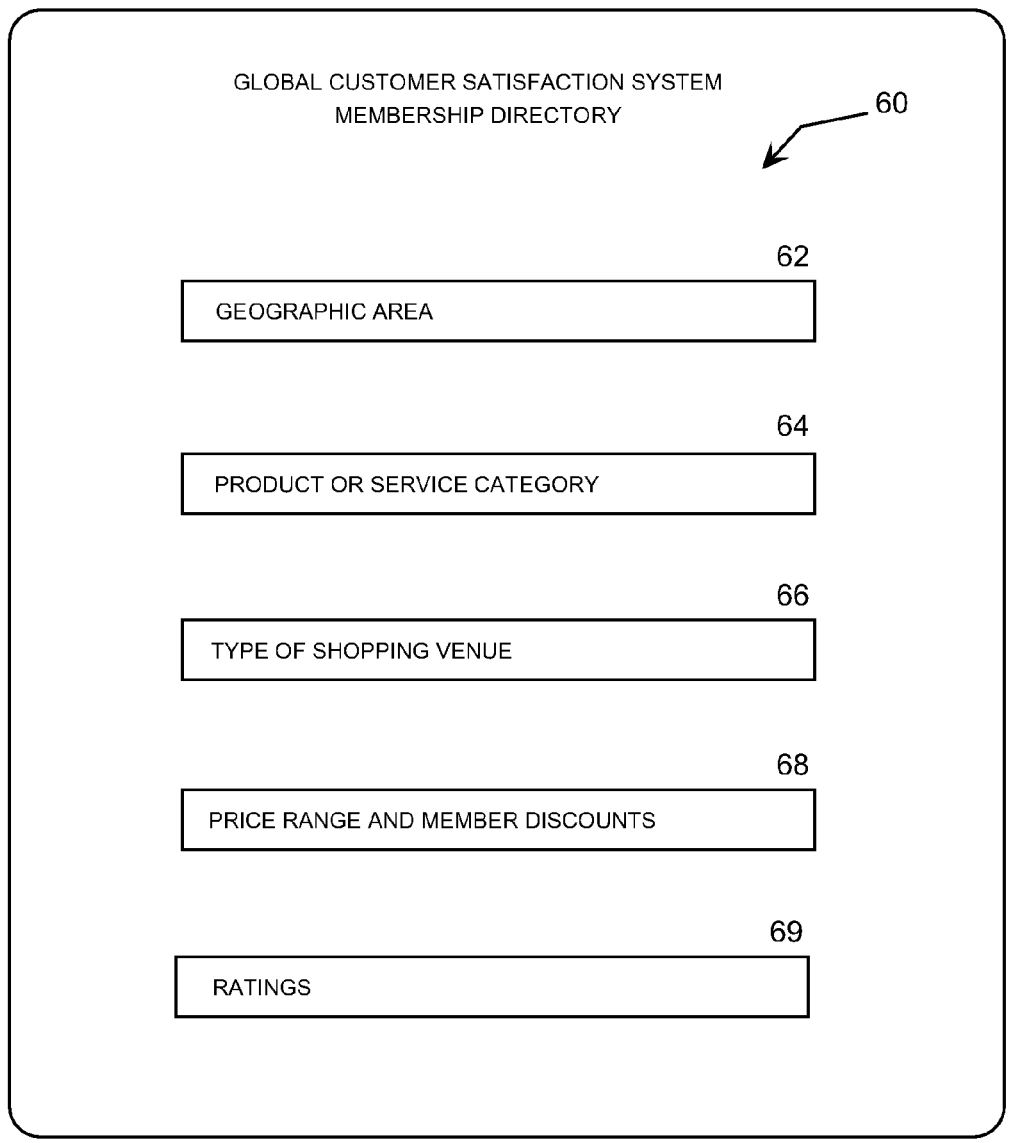
FIG. 6 is a conceptual illustration of a search engine user interface for a customer satisfaction qualified vendor directory.

FIG. 6 is a conceptual illustration of a search engine user interface 60 for accessing a customer satisfaction qualified vendor directory. In general, the directory is organized under a hierarchy of geographical areas, and for each geographical area further organized under a hierarchy of product and service categories. This is illustrated by the geographical area selection field 62 and the product or service category field 64. These selection items allow the member accessing the directory to select a specific geographical area and product and service category, and the search engine displays the entries for participating vendors meeting that criteria. In this particular example, the customer satisfaction qualified vendor directory can also be searched with additional qualifiers entered through a type of shopping venue selection box 66, a price range and member discounts selection box 68, and a ratings selection box 69. As an example, the member could enter "Miami, Fla." with the geographical area selection field 62, "electronic stores" with the product or service category field 64, "shopping mall" with the type of shopping venue selection box 66, select "at least five percent member discount" with the price range an member discounts selection box 68, and "at least a X rating of 3" with the ratings selection box 69. The search engine then return all of the vendor listing meeting those criteria. Each vendor listing includes contact information for the participating vendor and the X rating determined by the X system for that vendor, and may include links to a variety of other items, such as maps, coupons, advertisements, vendor reviews, product catalogs, etc.

Figure 7:
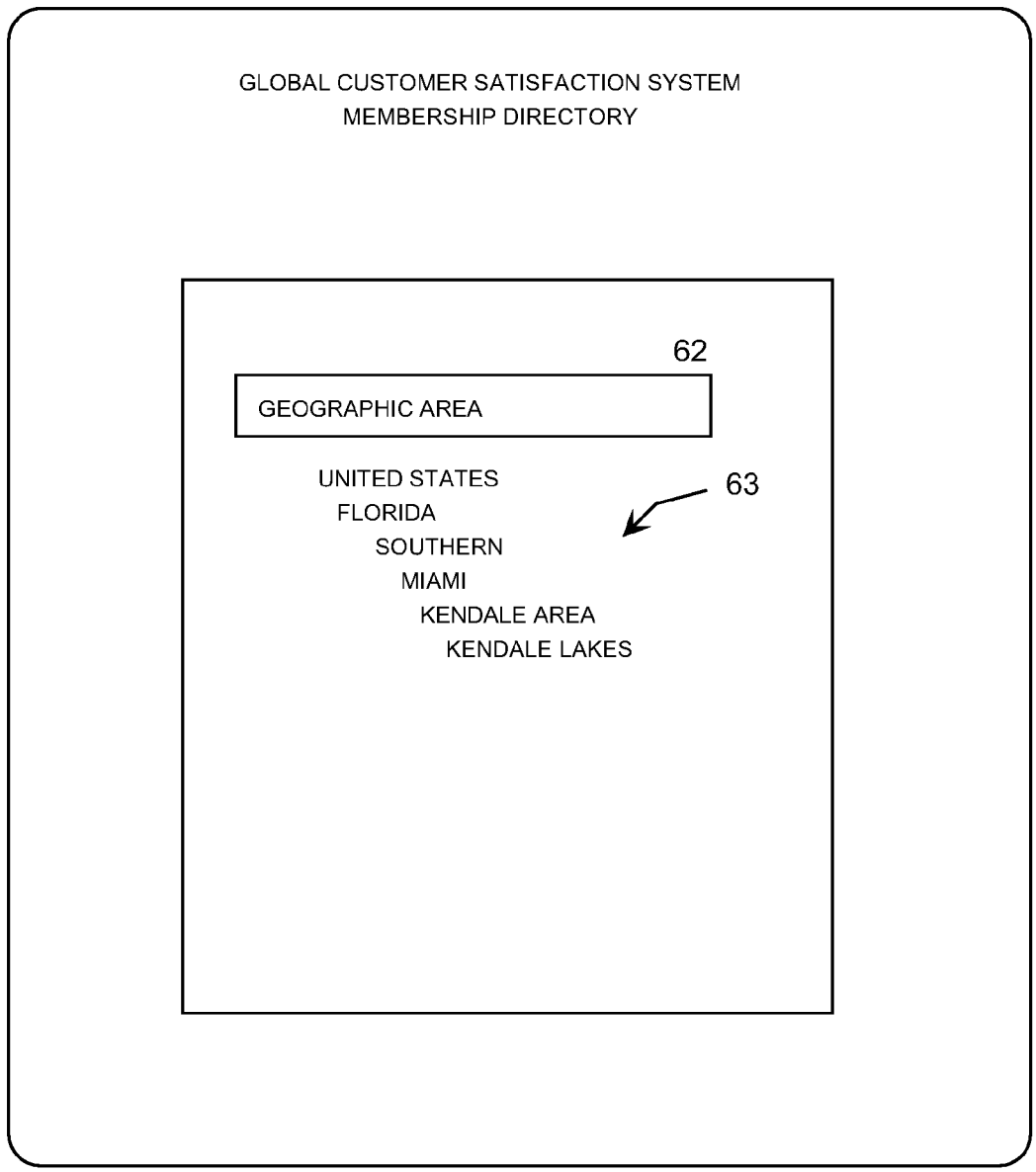
FIG. 7 is a conceptual illustration of a menu system for a geographic area category selection item of the search engine user interface for the customer satisfaction qualified vendor directory.

FIGS. 7-10 illustrate another specific example of specific criteria selections for the search engine showing examples of pull down menus for the selection boxes. As a particular example, FIG. 7 shows an illustrative geographical hierarchy 63 pulled down from the geographic area selection box 62. This particular hierarchy extends from a country selection down to a neighborhood, in case from "United States" to "Florida" to "Southern" to "Miami" to "Kendale Area" to "Kendale Lakes." The selection panels allow various alternatives to be selected at each level. For example, other countries at the level of the "United States," other U.S. states at the level of "Florida," and so forth.

Figure 8:
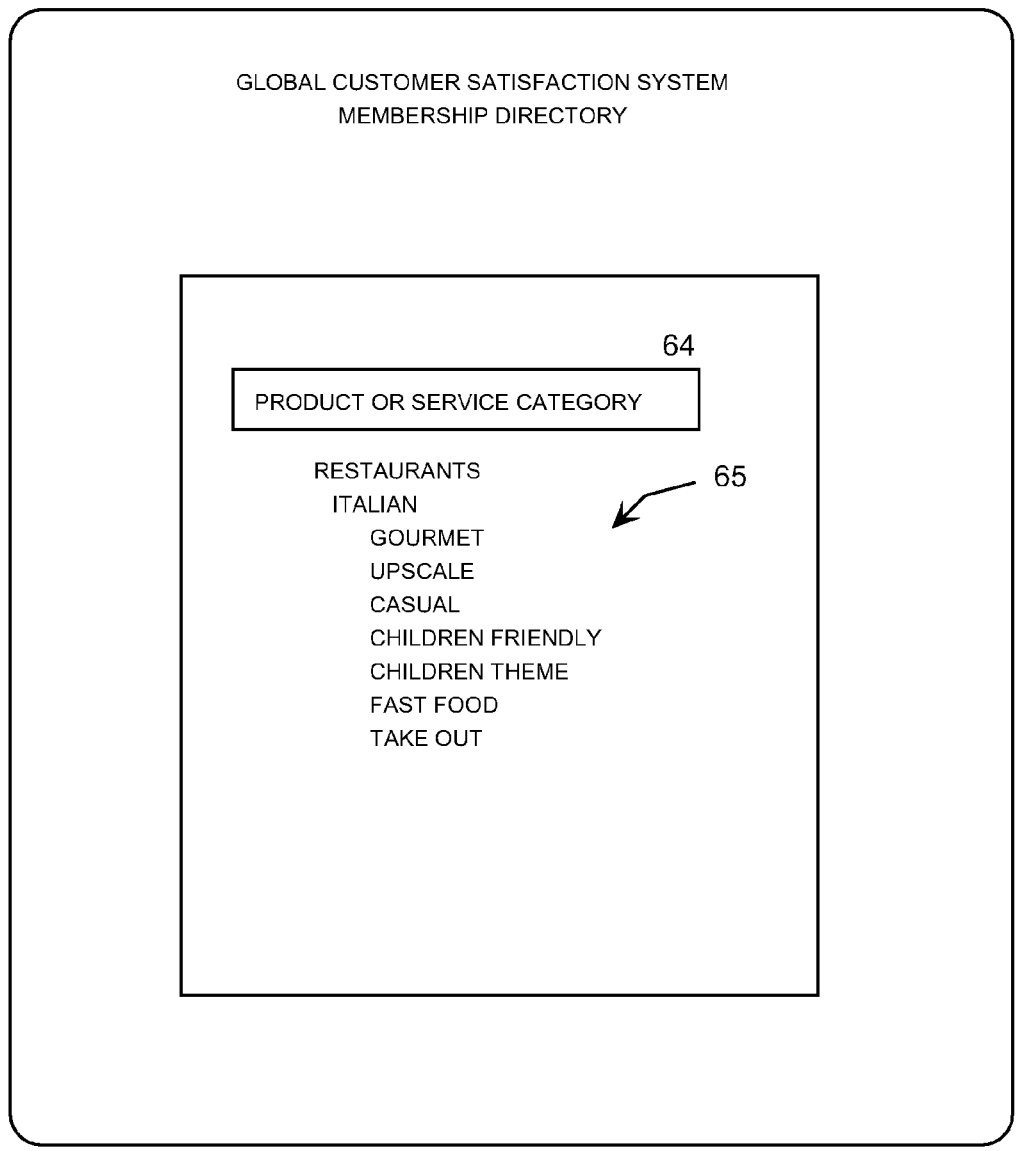
FIG. 8 is a conceptual illustration of a menu system for a product or service category selection item of the search engine user interface for the customer satisfaction qualified vendor directory.
Figure 9:
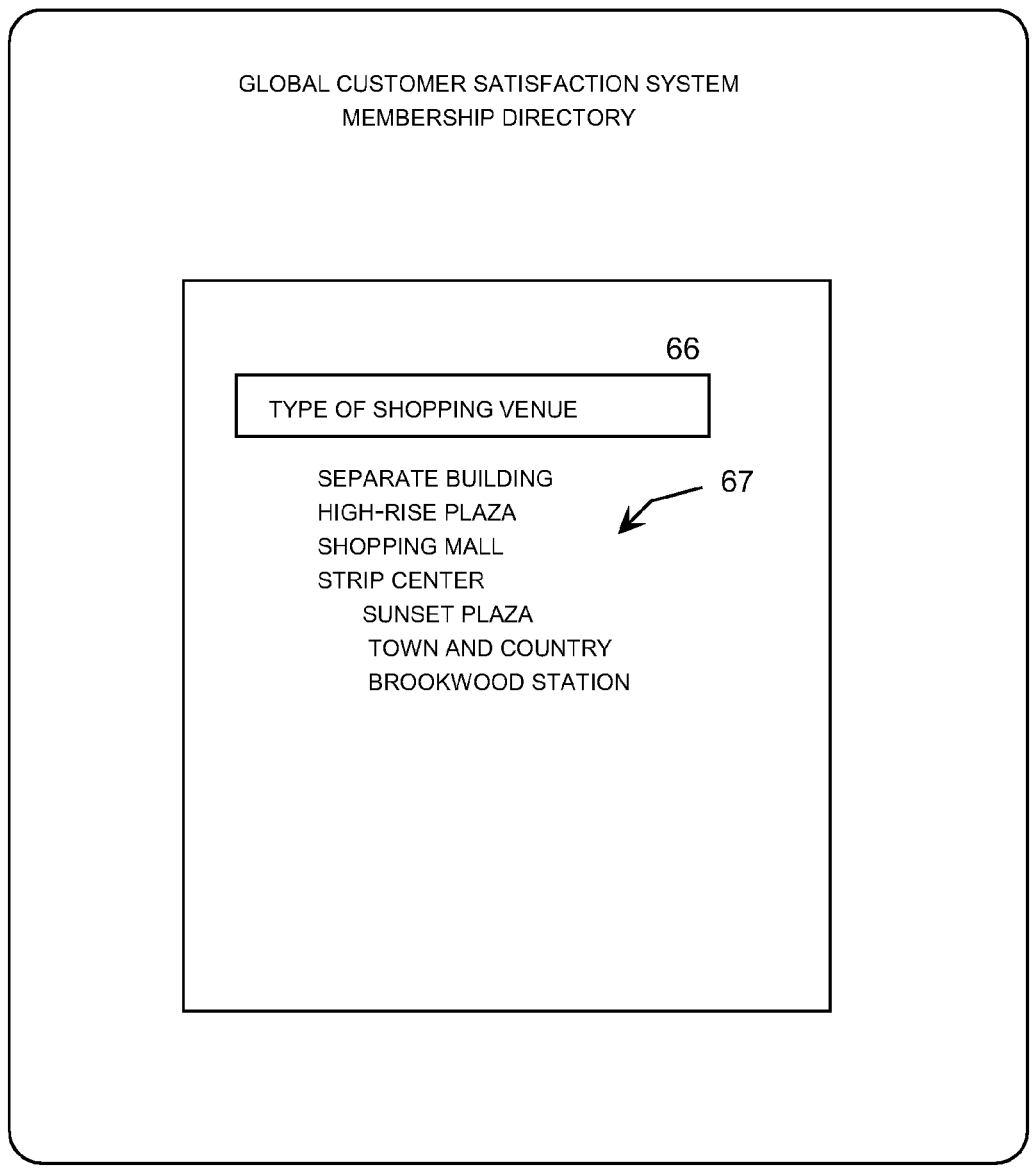
FIG. 9 is a conceptual illustration of a menu system for a type of venue category selection item of the search engine user interface for the customer satisfaction qualified vendor directory.
Figure 10:
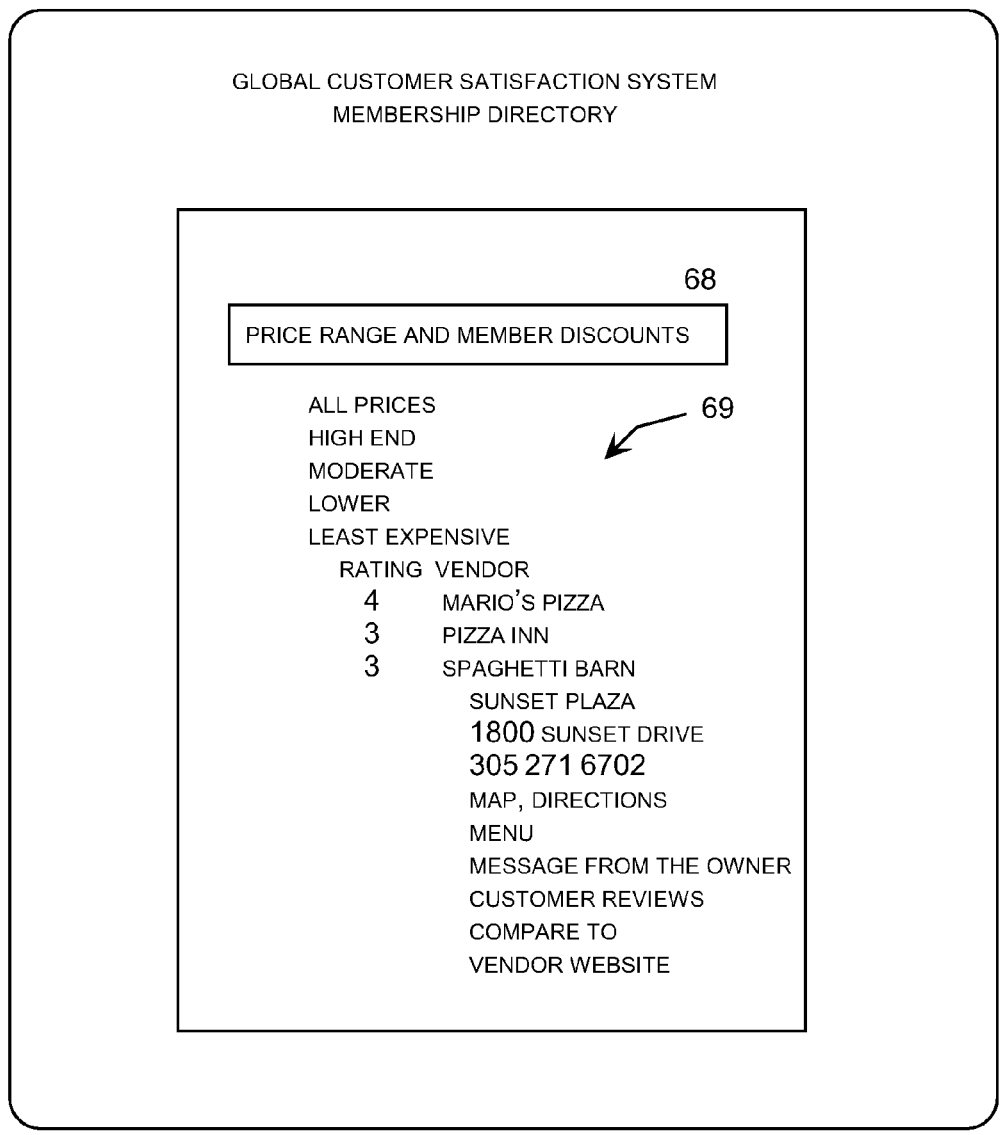
FIG. 10 is a conceptual illustration of a menu system for a price range selection item of the search engine user interface for the customer satisfaction qualified vendor directory.

FIG. 8 shows an illustrative product and service category hierarchy 65 pulled down from the product and service category selection box 64. This particular hierarchy extends from "restaurants" to "Italian" to several restaurant types including "gourmet," "upscale" and so forth. It will be appreciated that different hierarchies of sub-categories will be appropriate for different product and service categories and that many different options will be available for organizing the vendor directory under a hierarchical system for product and service categories. FIG. 9 shows an illustrative shopping venue hierarchy 67 pulled down from the type of shopping venue selection box 66. This particular hierarchy extends from types of venues, such as "separate building" and "high-rise plaza," to specific venues, such as "Sunset Plaza" and "Town and Country." FIG. 10 shows an illustrative price range hierarchy 69 pulled down from the price range and member discounts selection box 66. This particular hierarchy shows various price ranges from "high end" to "least expensive." As shown in FIG. 8, the specific vendor entry "Spaghetti Barn" includes the GCDD x rating for the vendor, contact information for the vendor including address and telephone, and hypertext links to additional resources including a map, directions, a message from the vendor, customer reviews, comparative vendors, and a link to the vendor's website. Of course, this particular vendor entry is merely illustrative and the actual set of information and links will vary from vendor to vendor.

Figure 11:
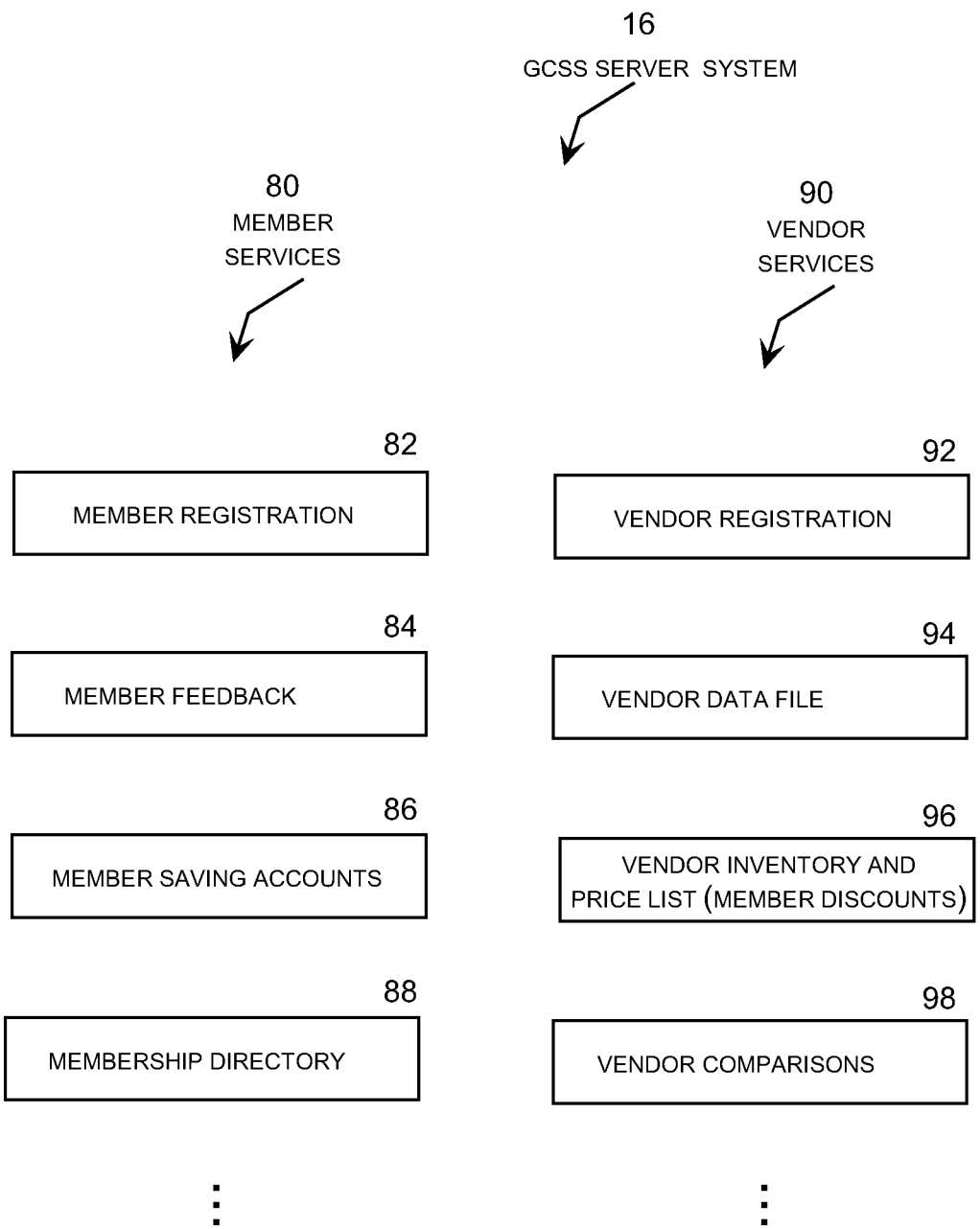
FIG. 11 is a conceptual block diagram of a server system for the system.

FIG. 11 is a conceptual block diagram of a server system for the system 10. In general, the system provides a number of member services 80 and a number of vendor services 90. The member services typically a member registration selection item 82 where customers can register and update their personal contact information, a member feedback selection item 84 where members can enter feedback and reviews and other relevant information, a member savings account selection item 86 where members can review their savings from rebates, points or other reward system, and a membership directory selection item 88 where users can access the customer satisfaction qualified directory and save search results from the directory search engine. For participating vendors, the vendor services include a vendor registration selection item 92, a vendor data file selection item 94 where the vendor can enter data to be included in the vendor entry in the customer satisfaction qualified directory, such as coupons, advertisements, a vendor inventory and price list selection item 96, and vendor comparisons 98. These particular member and vendor services are merely illustrative, and other features and services may be implemented to meet the needs of various members and vendors.

In view of the foregoing, it will be appreciated that present invention provides significant improvements in customer satisfaction systems. It should be understood that the foregoing relates only to the exemplary embodiments of the present invention, and that numerous changes may be made therein without departing from the spirit and scope of the invention as defined by the following claims.

TECHNICAL FIELD

The present invention pertains to the fields of vendor directories and customer satisfaction rating systems and, more particularly, to a system for receiving customer satisfaction ratings for participating vendors at points of sale and following the completion of sales, aggregating the ratings received form customers into x ratings for participating vendors, and providing a customer satisfaction qualified vendor directory indicating the x ratings for the participating vendors.

BACKGROUND

Systems for providing informed opinions regarding products and services have been in use for many years. For example, Consumer Reports® publishes a guide in which comparable models of products are rated by experts who conduct appropriate research. The results are typically compiled and presented in the form of consumer reports that are organized or searchable by product showing the various competitive models and indicating ratings such as "star ratings" assigned to the various models by the researchers. A wide variety of product and service reviews are currently available, typically organized into guides comparing and rating particular categories of products or services. For example, one can find automotive guides comparing and rating automobiles, movie guides comparing and rating movies, hotel guides comparing and rating hotels, restaurant guides comparing and rating restaurants, and the like.

With the increasing popularity of online shopping, major online sales organizations have also developed systems for receiving and publishing customer feedback regarding particular sellers as a way to provide purchasers with information regarding experience that prior shoppers have had with the vendors. Google® and Amazom®, for example, provide online shopping customer feedback systems that have become quite sophisticated. These systems typically employ a rating system, such as "star ratings" applicable to particular vendors, and also provide users with access to individual customer comments, product or service reviews, critiques of product or service reviews, and other information. In general, these systems are useful for informing the online shopping community about particular products, service and vendors, including disseminating customer feedback and to potential purchasers about superior and sub-standard performers.

Vendor directories organized by product or service categories have also been in use for many years. These directories are often organized or searchable by geographical area, and for each geographic area are further organized into categories of products and services. The most prominent examples are the "Yellow Page" directories, which are typically published annually on a community-by-community basis. As another example, Thomas Register® publishes technical directories of vendors for industrial products and services organized by category of product or service. Many variations of these types of vendor directories have been developed over the years and can currently be found both in print and online formats. Records of complaints and other customer feedback information are also made available for individual vendors, for example through the Better Business Bureaus.

Although there are a variety of vendor information systems, product and service rating systems, customer feedback systems, and vendor directories available today, these resources are typically provided separately. As a result, a potential purchaser researching a major purchase may consult with a variety of these resources to become well informed about the choices available. For example, the customer may first conduct research into the available product models using product guides. Having found a specific model of the desired product, the customer may then do some comparative shopping using a Yellow Page vendor directory to find a local or online vendor offering the product at an attractive price. Having found a particular vendor selling the desired model at an attractive price, the careful shopper may check the Better Business Bureau or other available resources or reviews regarding that particular vendor.

While there is a great deal of information available to assist the shopper, accessing and navigating through that information can be tedious and time consuming. In addition, the time needed to make a comprehensive investigation into a particular product or service increases as the amount of available information increases. Of course, specific reviews, ratings and customer feedback statements can be biased, contradictory or even falsified. With the proliferation of free and subscription based information available in print and online, and with the proliferation of advertisements, vendors, websites and blogs, culling through all of the available information and determining which sources are most reliable information can be a substantial challenge.

This situation presents potential customers with challenges as they attempt to wade through all of the available information regarding a prospective purchase, which may be impractical for all but relatively significant purchases. This situation also presents reputable vendors with substantial communication challenges, as they seek cost effective ways to communicate with potential customers in the increasingly cluttered environment of modern communication and advertisement systems.

As a result, there is an ongoing need for cost effective systems to help customers conduct comparative shopping and find reputable vendors, and for reputable vendors to provide relevant information to potential customers.

SUMMARY OF THE INVENTION

The present invention solves these problems in a system known as the System that creates and provides a network of subscribers and vendors with access to a customer satisfaction qualified vendor directory. At a basic level, the customer satisfaction qualified vendor directory is similar to a conventional Yellow Page vendor directory system that includes participating vendors organized by geographical area and categories of products and services, except that each vendor listing also includes a x rating. Additional "deep links" may also be provided for accessing maps, customer reviews, vendor statements, coupons, advertisements, and so forth.

The system includes point-of-sale customer feedback terminals for receiving in-store customer feedback including satisfaction ratings and other customer feedback regarding participating vendors as the customers pay for purchases. The system also includes post-sale customer feedback terminals for receiving more detailed customer feedback regarding the vendors from customers after the sales have been completed. The system also includes an aggregation and dissemination system for combining the ratings received form customers into x ratings for participating vendors, and disseminating the customer satisfaction information through customer satisfaction qualified directories, which are organized or searchable by geography and type of product or service offered by the participating vendors.

Generally described, the invention may be practiced as a customer satisfaction system that includes a number of customer satisfaction rating terminals that receive customer satisfaction feedback from customers related to vendors. The system also includes a customer satisfaction aggregation system that receives the customer satisfaction feedback from the customer satisfaction rating terminals and consolidates the customer satisfaction feedback to provide a customer satisfaction rating associated with each vendor. The system further includes a customer satisfaction dissemination system that provides access to a customer satisfaction qualified vendor directory system. The directory contains a listing of vendor entries, in which each vendor entry contains contact information and the customer satisfaction rating determined by the customer satisfaction aggregation system for the associated vendor. The customer satisfaction qualified vendor directory is also organized or searchable by geographic location of the vendors, and for each geographic location contains vendor entries organized or searchable by category of product or service offered by the vendors.

The customer satisfaction rating terminals typically include a number of point-of-sale terminals located at vendor store locations. Each point-of-sale terminal is associated with a particular vendor, located on the premises of the vendor in association with a purchase check out station where customers pay for purchased items. Each terminal is operable to receive customer satisfaction feedback while the customers are located at the check out station. For example, the point-of-sale terminals may be incorporated into financial card reader stations that are operable for reading financial cards and for receiving customer satisfaction feedback. The customer satisfaction rating terminals may also include a number of post-sale terminals, wherein each post-sale terminal is configured to provide post-sale customer feedback through online communication with the customer satisfaction aggregation system. In particular, any computer with an Internet connection may be used to contact a server operated by the customer satisfaction system and provide post-sale customer feedback.

Optionally, the customer satisfaction system may also include a member reward system that issues rewards to customers who have registered as members of the customer satisfaction system, and who enter customer feedback into the customer satisfaction rating terminals. For example, the rewards may include purchase price discounts, rebates, deposits to savings accounts, points in a points-based rewards program, or another suitable reward program.

The customer satisfaction dissemination system may utilize printed customer satisfaction qualified vendor directories published for various geographic locations. As a more convenient option for many situations, the customer satisfaction qualified vendor directory may be made available to registered members through an online server that provides electronic access to the customer satisfaction qualified vendor directory through a search engine. In this case, the directory is accessed through a menu-driven user interface for the search engine that locates vendor entries organized through a hierarchy of geographic areas, product and service categories, and other factors. The vendor entries may also include hypertext links to additional information, such as maps, customer reviews, coupons, advertisements, and so forth.

It should also be understood that many other advantages and alternatives for practicing the invention will become apparent from the following detailed description of the preferred embodiments and the appended drawings.

BRIEF DESCRIPTIONS OF THE DRAWINGS

FIG. 1 is conceptual block diagram of a system.

FIG. 2 is a conceptual illustration of a point-of-sale customer satisfaction terminal integrated with a financial card processing terminal configured for in-store sales.

FIG. 3 is a conceptual illustration of a point-of-sale customer satisfaction terminal configured for online sales.

FIG. 4 is a conceptual illustration of the point-of-sale customer satisfaction terminal displaying an set of customer feedback questions.

FIG. 5 is a conceptual illustration of a post-sale customer satisfaction terminal.

FIG. 6 is a conceptual illustration of a search engine user interface for a customer satisfaction qualified vendor directory.

FIG. 7 is a conceptual illustration of a menu system for a geographic area category selection item of the search engine user interface for the customer satisfaction qualified vendor directory.

FIG. 8 is a conceptual illustration of a menu system for a product or service category selection item of the search engine user interface for the customer satisfaction qualified vendor directory.

FIG. 9 is a conceptual illustration of a menu system for a type of venue category selection item of the search engine user interface for the customer satisfaction qualified vendor directory.

FIG. 10 is a conceptual illustration of a menu system for a price range selection item of the search engine user interface for the customer satisfaction qualified vendor directory.

FIG. 11 is a conceptual block diagram of a server system for the system.

DETAILED DESCRIPTION OF INVENTION

The present invention may be embodied as a System (X system or network) in which members (X customers or purchasers) have the ability to provide instant customer satisfaction ratings applicable to participating vendors (X vendors or sellers) at point-of-sale terminals (X terminals). These customer satisfaction ratings are compiled and published as a composite customer satisfaction indicator (X rating) within one or more customer service qualified vendor directories (X directories), thus providing other members with the ability to preview the aggregate ratings given to any participating X vendor prior to making any purchase. The X directories can be published in print for particular geographic areas or product or service categories. The most effective customer tool for most situations is a searchable, online x vendor directory (X x directory) with a user-friendly interface that allows X customers to easily conduct searches within selected geographic areas, product and service categories, price ranges, and other criteria. In addition to the X rating that provides consolidated customer feedback information at a glance, the x directory also provides "deep links" to more detailed resources, such as customer reviews, professional reviews, critiques of reviews, product catalogs, detailed product specifications, price lists, statements from the vendors, advertisements, comparative listings, maps, and a wide range of other information that they system designers, members, vendors and other users elect to incorporate into the database.

As an organization tool for a wide range of information sources, the X directory is designed, and is expected to further develop over time, to be a robust customer satisfaction database accessed through the X directories. By organizing the customer feedback and other information under a vendor directory system organized by geographic area and product and service categories, the X system can be easily accessed by X members when shopping for many different kinds of products or services in many different locations.

In addition to providing user feedback stations at point-of-sale locations, the X system also allows members to provide post-sale detailed feedback in the form of ratings and commentary. The system also provides the member with the ability to search for X participating vendors based on ratings aggregated into the system and also based on the amount of discount given by the participating vendor to members of the network. These searches can be done online using the system's website or on the system's mobile application created for cellular phones. Ratings, discounts and listings of participating vendors can also be found in hard-copy X vendor directories published regularly by the operators of the X network.

X ratings given at the point of sales typically include a x rating on a scale of one to five for easy completion by the member at the point of sale. The customer feedback station provided at the point-of-sale may also accept more detailed feedback in the form of responses to customer satisfaction related questions in a rating or multiple choice format, such as price satisfaction, checkout time, availability of parking, safety and security, cleanliness of store, variety of selection, shopping experience, and other parameters that can be easily entered at the point of sale. The member may alternatively enter this level of feedback information through a post-sale terminal. In addition, more detailed feedback, such as specific comments, detailed reviews, and so forth are typically entered through the post-sale review, which is typically entered online or through email. The x rating and any other feedback entered at the point of sale is typically entered into the same card-swipe terminal that is used to process the customer's payment. Additional and usually more detailed post-sale feedback can also be entered online concerning factors such as fairness of price, quality of goods and services, after-sales services (warranty, guarantee, etc), written reviews, reviews of reviews, and any other type of suitable feedback.

The X network also provides for the implementation of discounts and other rewards offered by participating vendors to X members. The rewards can be provided in the form of price reductions implemented at the point of sale, rebates, deposits into savings accounts, points systems, or any other suitable reward system. Member discounts may be optional or mandatory, and may be applied to all members on a level basis, may be weighted, and may be used to reward specific factors. For example, members may earn a reward by entering the point-of-sale feedback, entering the post-sale feedback, transacting a certain amount of business within the X network, maintaining a financial account associated with the X network, or other factors. Member discounts may also made available or increased based on other factors, such as the amount of business transacted in the X network, the length of membership, whether the member is also a participating vendor, the amount of business a member-vendor transacts in the X network, the amount of discount that a member-vendor offers to other members, whether the member regularly provides point-of-sale feedback, whether the member regularly provides post-sale feedback; whether the member's reviews are well received in the X network, and so forth.

The participating vendors in the X network is suitable to cover all sectors of retail and wholesale industrial sectors, manufacturers, commercial entities, and service providers, both within the public and private sectors. The potentially x extent of the X system and its all-inclusive nature demonstrate the uniquely wide scope of this x network, which constitutes an important characteristic of the X network. The xization process and major developments in information and communication technologies on the one hand, and the rising demands of the value-conscious customers on the other hand, provides fertile ground for development of the X network in a manner and scope that has the potential to drastically improve over the current state of retail business standards. The main objective of the X network is to provide a system for monitoring and communicating customer satisfaction as expressed by past customer to prospective future customers, so as to reward reputable and high quality vendors with X member good will, as reflected in the customer service information made available to the members though the X vendor directories. The end result of the X network is to strongly improve, and even evolve to a higher stage, the existing retail business standards.

In the current retail sales environment, product and service providers are not required to accept or publish customer satisfaction ratings or other feedback despite the fact that such ratings could improve the quality of goods and services. Of course, those vendors experiencing high levels of customer satisfaction would welcome a low cost ability to receive and disseminate this type of information to their prospective customers, while those vendors experiencing lower levels of customer satisfaction would be less willing to provide this information to prospective customers. The X network provides a mechanism for expression of the degree of customer satisfaction both at the point of sale, typically through entry of a single x rating or a very brief list of rating items concerning the general level of performance, and post-sale, typically allowing more detailed feedback concerning fairness of the price, quality of received goods and services, post-sale activities such as warranty or return issues, detailed product or vendor reviews, and the like.

This mechanism acts to reward superior vendor performance and penalize inferior vendor performance through the communication of customer satisfaction information entered by past customers to potential future purchasers, and thereby serves the interests both sides of the transactions who seek good faith and superior performance. It serves the interests of the customer by providing readily available customer satisfaction information and the possibility of receiving discounts on the prices of goods and service—either as a direct discount paid at the point of sale or as a deposit to the customer's saving account—and also provides to the customer a possibility to rate the performance of vendors both at the point of sale and after the point of sale. The system also serves the interests of those vendors who wish to increase their customer base by consistently providing superior goods and services, as recognized by consumers and communicated to others through the X network.

The X system includes a network of participating vendors and consumer-members who form a customer base for the participating vendors. The objective of the X network is to connect participating vendors with consumer-members, where consumer-members provide customer satisfaction related feedback, upon purchase and later regarding after-sales services. The members may also receive a predetermined discount or other reward from the participating vendors. In a typical implementation of the X system at the point-of-sale location, the member swipes his/her membership card or provides his/her member-id/password (e.g., for online services) and is authenticated by the system. The member then enters customer service satisfaction information and, in cases where member discounts are offered, receives a predetermined discount, rebate or point award based on the sum-total of the purchase. The specific discounts or other rewards offered by a vendor are typically determined under a X participation agreement between the X system operator and the participating vendor.

The point-of-sale customer satisfaction information is typically received in the form of a x rating, and may also include a short list of ratings or multiple choice question electronically displayed on a terminal at the point of sale. In particular, the questions may be displayed on the card-reader/keypad that is used to read the customer's magnetic X membership card, and the user responds by selecting a rating or a response from a multiple choice question to which the customer responds by punching in a number using the keypad on the terminal. In electronic points of sales, such as online stores, the user sees the discounted total of the purchases made on the website and a customer-service related question on the same page, and the user responds by selecting one of the provided responses. The discount provided by the participating vendor and the customer feedback question/response may be voluntary feature or a requirements for vendor participation in the X system.

The X system may also include in-store customer feedback stations from which user rates listed items or answers multiple choice questions, such as a card-reader/keypad combo that first recognizes the user at the point of sales from the data written onto the magnetic card. Customer satisfaction and the customer's shopping details are transmitted from the input mechanisms to the X database; where the ratings given concerning a participating vendor are aggregated into existing ratings and the customer's shopping details may be recorded in a database that provides the customer with access to details regarding the customer's shopping history. Users of the X system will be able to find participating vendors and the aggregate of the ratings given to any participating vendor through print or online access to customer satisfaction qualified vendor directories. Individual customers have the ability to view their shopping histories and the savings made through X on the section of the X site that is dedicated to the customer's shopping history.

Turning now to the figures, in which like numerals refer to like elements throughout the several figures, a particular embodiment of the invention will be described with reference to the figures. Although the customer satisfaction system can be implement in a wide variety of ways with many areas of sophistication, the figures show a simple example for the purpose of illustrating the principles of the invention. In practice, many different types of customer satisfaction systems with different features and levels of sophistication may be implemented, and the features implemented by these systems may vary for different types of vendors and members. FIG. 1 is conceptual block diagram of a system 10. The system includes a number of point-of sale customer feedback stations 12*a-n*. Some of these rating systems may be specifically designed for in-store locations, and other may be configure for online shopping. For both types of stations, the point-of sale customer feedback stations 12*a-n* are configured to receive customer feedback in the form of customer satisfaction ratings that can be quickly entered at the time that the customer pays for a purchase. Typically, the point-of sale customer feedback stations utilize a simple "1 through 5" or similar ranking system that allows the customer to enter the satisfaction rating quickly as the customer completes the purchase check-out process. The point-of sale customer feedback may also allow the user to enter additional structured feedback, such as ratings for a list of specific items ore multiple choice answers to a list of specific questions. Specific examples are described further with reference to FIGS. 2-4.

The system 10 also includes a number of post-sale customer feedback stations 14*a-n*, which are typically configured for allowing customers to enter more detailed feedback after the purchase has been completed, when time pressures of completing a purchase are not present. In particular, any computer with an internet connection can be used an a post-sale customer feedback station whenever the customer would like to enter the feedback. Typically, a X vendor number printed on a sales receipt or the participating vendor's name will be all that the user needs to know to locate the correct vendor the online X directory to enter a variety of types of customer feedback. Customers can use the post-sale customer feedback stations to enter feedback that is not yet available or too time consuming to enter at the point of sale, such as detailed statements regarding their shopping experience and any product support, return or warranty issues that occurred after the sale. The members can also enter product reviews, vendor reviews, critiques of reviews, and so forth. The objective using two types of customer feedback stations is to have point-of-sale customer feedback stations 12*a-n* that all or most members are prompted to use very quickly to entered structured form feedback as purchases are completed, and post-sale customer feedback stations 14*a-n* available for that those customers who which to make more detailed, non-structured form commentary when time permits. A specific example of a post-sale feedback terminal is described further with reference to FIG. 5.

The system 10 also includes a customer feedback aggregation and dissemination system 16, which is typically configured as an Internet server system. This system aggregates the feedback received from various customers into a consolidated customer satisfaction ranking, typically on a scale from one to five, for each participating vendor in the network. For example, the ratings entered by customers can be aggregated by averaging or weighted averaging taking certain factors into account in the weighting factors. For example, more recent ratings may be given more weight that older ratings, ratings from higher volume shoppers may be given more weight that ratings from lower volume shoppers, ratings from members who have been registered in the network longer may be given more weight than rating from more recent members, and so forth. Many different techniques can be used to combine and normalize the customer ratings received for a particular vendor into an aggregate or x rating, and different aggregation algorithms may be used for different product or service categories.

The customer feedback aggregation and dissemination system 16 also makes the customer satisfaction information to members of the network. Specifically, customer satisfaction information is disseminated to the members though a customer satisfaction qualified vendor directory. This is similar to a traditional yellow page directory, except that it typically covers multiple geographic areas, and that each vendor entry includes customer satisfaction feedback information, such as a x X rating. In particular, the customer satisfaction feedback information typically includes at least the aggregate or x rating determined by the X system from member feedback, typically expressed on a scale of one to five, and a number of "deep links" to more detailed customer feedback information. Accordingly, the x X rating for a particular vendor will be a dynamic figure that can change over time as new customer feedback is entered into the customer feedback aggregation and dissemination system 16 and older feedback ages becomes less relevant.

The system 10 also includes a system of member accounts 17*a-n* for its members. The member accounts allow members to register, input and change contact information, obtain vendor directories, enter post-sale feedback, and so forth. Each member account may include a reward system for providing the member with an incentive for using the X network. As a first example, the member may receive a discount on the price of goods or services applied at the point of sale. As another example, the member may receive a rebate deposited into a savings account maintained by the operator of the X network. A points systems may also be used as another example. Different members may receive different levels of rewards, for example based on the amount of business they do through the network, the length of time they have been a member in the system, whether they provide customer service feedback, whether they are a vendor participating in the network, and other factors.

The customer satisfaction qualified vendor directory can be published in printed form for a variety of geographic locations, and a more convenient dissemination mechanism is the online directory accessed through a search engine with a menu-driven user interface. In general, the members access the customer satisfaction qualified vendor directories 18*a-n* through printed or online access, as desired to support their shopping needs. A specific example of an online customer satisfaction qualified vendor directory is described further with reference to FIGS. 6-10.

FIG. 2 is a conceptual illustration one type of customer feedback station, in this example a point-of-sale customer satisfaction terminal 20 integrated with a financial card processing terminal configured to process customer payments for in-store sales. To receive customer feedback quickly and easily as the customer pays for a purchase, the point-of-sale customer satisfaction terminal preferably enables the user to enter a single x rating on a scale from one to five. The rating is displayed in a window 22, and the customer toggles a first button 24 to change the rating and a second button 26 to enter the rating. The point-of-sale customer satisfaction terminal may also have a mechanism, such as a touch-screen field 28 that the customer can touch with a finger or stylus, to access an additional screen for entering customer feedback information. An example of a additional screen for entering customer feedback information is shown in FIG. 4 FIG. 3 is a conceptual illustration of a point-of-sale customer satisfaction terminal 30 configured for online sales. This visible interface similar to the customer satisfaction terminal 20 used for in-store sales, except that it is suitable for displayed on a computer screen as the customer goes through the online shopping check out process. In this example, the user interface includes a window 30 where the customer enters the desired rating, a button or field where the user clicks to enter the rating, and a button or field where the user clicks to access an additional customer feedback panel. The point-of-sale customer satisfaction terminal should be intuitively easy to understand at a glance and very quick and easy to use. Although may different options could be implemented for this function, the example illustrated meets these basic objectives while still allowing the customer to enter meaningful feedback information very quickly.

FIG. 4 is a conceptual illustration of the point-of-sale customer satisfaction terminal displaying a set of customer feedback rating items 40. In this example, the terminal displays a number items that the customer can rate individually on a scale from one to five. In this particular illustration, the user can use three of the buttons on the terminal to select among the items, toggle through the available ratings, and enter the feedback. For example, the customer can enter a separate rating for "price satisfaction," "checkout time," "availability of parking," "safety and security," "cleanliness," "variety of selection," and "shopping experience." Of course, other types of questions such as multiple choice could be displayed, additional user feedback panels could be implemented, and the specific items inquired about on the panel is a matter of design choice and may be different for different types of stores.

FIG. 5 is a conceptual illustration of a post-sale customer satisfaction terminal 50. This is a simple example that allows the member to identify a specific vendor, for example by entering a vendor X number, vendor name, or linking to the post-sale feedback from a vendor entry. Many different options may be used for receiving post-sale feedback including unstructured formats, such as textual reviews written by customers, critiques of reviews, and other types of detailed feedback.

FIG. 6 is a conceptual illustration of a search engine user interface 60 for accessing a customer satisfaction qualified vendor directory. In general, the directory is organized under a hierarchy of geographical areas, and for each geographical area further organized under a hierarchy of product and service categories. This is illustrated by the geographical area selection field 62 and the product or service category field 64.

These selection items allow the member accessing the directory to select a specific geographical area and product and service category, and the search engine displays the entries for participating vendors meeting that criteria. In this particular example, the customer satisfaction qualified vendor directory can also be searched with additional qualifiers entered through a type of shopping venue selection box 66, a price range and member discounts selection box 68, and a ratings selection box 69. As an example, the member could enter "Miami, Fla." with the geographical area selection field 62, "electronic stores" with the product or service category field 64, "shopping mall" with the type of shopping venue selection box 66, select "at least five percent member discount" with the price range an member discounts selection box 68, and "at least a X rating of 3" with the ratings selection box 69. The search engine then return all of the vendor listing meeting those criteria. Each vendor listing includes contact information for the participating vendor and the X rating determined by the X system for that vendor, and may include links to a variety of other items, such as maps, coupons, advertisements, vendor reviews, product catalogs, etc.

FIGS. 7-10 illustrate another specific example of specific criteria selections for the search engine showing examples of pull down menus for the selection boxes. As a particular example, FIG. 7 shows an illustrative geographical hierarchy 63 pulled down from the geographic area selection box 62. This particular hierarchy extends from a country selection down to a neighborhood, in case from "United States" to "Florida" to "Southern" to "Miami" to "Kendale Area" to "Kendale Lakes." The selection panels allow various alternatives to be selected at each level. For example, other countries at the level of the "United States," other U.S. states at the level of "Florida," and so forth.

FIG. 8 shows an illustrative product and service category hierarchy 65 pulled down from the product and service category selection box 64. This particular hierarchy extends from "restaurants" to "Italian" to several restaurant types including "gourmet," "upscale" and so forth. It will be appreciated that different hierarchies of sub-categories will be appropriate for different product and service categories and that many different options will be available for organizing the vendor directory under a hierarchical system for product and service categories. FIG. 9 shows an illustrative shopping venue hierarchy 67 pulled down from the type of shopping venue selection box 66. This particular hierarchy extends from types of venues, such as "separate building" and "high-rise plaza," to specific venues, such as "Sunset Plaza" and "Town and Country." FIG. 10 shows an illustrative price range hierarchy 69 pulled down from the price range and member discounts selection box 66. This particular hierarchy shows various price ranges from "high end" to "least expensive." As shown in FIG. 8, the specific vendor entry "Spaghetti Barn" includes the GCDD x rating for the vendor, contact information for the vendor including address and telephone, and hypertext links to additional resources including a map, directions, a message from the vendor, customer reviews, comparative vendors, and a link to the vendor's website. Of course, this particular vendor entry is merely illustrative and the actual set of information and links will vary from vendor to vendor.

FIG. 11 is a conceptual block diagram of a server system for the system 10. In general, the system provides a number of member services 80 and a number of vendor services 90. The member services typically a member registration selection item 82 where customers can register and update their personal contact information, a member feedback selection item 84 where members can enter feedback and reviews and other relevant information, a member savings account selection item 86 where members can review their savings from rebates, points or other reward system, and a membership directory selection item 88 where users can access the customer satisfaction qualified directory and save search results from the directory search engine. For participating vendors, the vendor services include a vendor registration selection item 92, a vendor data file selection item 94 where the vendor can enter data to be included in the vendor entry in the customer satisfaction qualified directory, such as coupons, advertisements, a vendor inventory and price list selection item 96, and vendor comparisons 98. These particular member and vendor services are merely illustrative, and other features and services may be implemented to meet the needs of various members and vendors. Customer satisfaction survey system (CSSS)

TECHNICAL FIELD

The present invention is related to the customer satisfaction survey system and receiving the customers 'feedback and ranking them and providing different comparative lists from suppliers and vendors of goods and services. More specifically, the invention is a system for receiving satisfaction rank and level of customers/consumer of goods and services (customer satisfaction rate-CSR), generally or partially, from each category of vendors/suppliers and manufacturers of various types of goods and services and also from different received goods and services in the point of sale/service or post-sale, through different ways and then concluding and integrating the ranks for each vendor, supplier or producer unit of goods and services that have entered the system and any category of goods and services received from them and defining the satisfaction rate of members for each of them and also publication and presentation of these rankings that are obtained directly from the customers and consumers comments in different forms of lists, reports and diagrams.

In other words, through entering the goods and services transaction cycle, the customer satisfaction survey system integrates and summarizes the satisfaction rankings of one party of this cycle that is those who buy, consume or receive (customers and consumers/client) in relation to the other party of the cycle of goods and services who are those sell, supply or manufacture (different category of venders, suppliers/manufacturers) and also in relation to what is sold, purchased, supplied or offered (a wide range of goods and services), in location and time of the transaction (in selling or offering locations) through some financial transaction means and approaches or other ways, and also in a different location and time (after sale/reception) in a clear procedure and publishes the conclusions as a Customer Satisfaction Ranking for each vendor/supplier and manufacturer unit or each unit of received goods and services in various ways and forms.

DESCRIPTION

According to the inclusion, extended range and diversity of the parts and elements involved in the system, the role and the quality of any of the elements and parts of the goods and services transaction cycle are going to be described in relation to the system and their replacement approach and definition.

Main elements of goods and services transaction cycle in system:

Main elements of goods and services transaction cycle in system

1—Members

Any one who buy or receive any goods and services from anywhere and by any approach is a member of system. it is clear that by this definition, all people are member of system.

These members are located in outset and end of transaction cycle and they connect both head of system as initiators and users of system.

In one hand, they start transaction cycle by buying goods and receiving various services in outset of system, meanwhile by declaring their opinion and level of satisfaction of system elements works as feeding source of system and supply required feed for system operating. these members are classified as follow in accordance with their operation type in transaction cycle and how interacting with customer satisfaction assessment system:

A) effective members who buy goods and services in various financial transaction processes in using equipment and services for establish and facilitating of this transactions.

1—goods buyers
2—service buyers
a-1) goods buyers:

this group of system members, although have some radical and general similarities with second group, they are different from them to some extent. Fore example, their reference in transaction cycle are various good suppliers (like actual and virtual venders), different manufacturers and finally manufactured goods themselves.

1-1-a) Actual venders which are located in actual sites like streets and alleys and offer their goods in their sites to which buyers should refer for buying. This group of venders include various trade careers based on the type of their activity (from supermarkets, restaurants, carpet stores, boutique to home appliance vendors, butcher and so on) and cover different types of locations, sites and manner of supply. Markets, shopping centers and department stores, seasonal and regional marketplaces, peddlers and kiosks and even vending machines are example of these type of venders.

2-1-b) virtual venders. virtual venders.

These types of goods venders are including badgers and online venders where their operation region, goods and supply methods experience high diversity. in this method, venders expose their goods in their shop and again sell them online via virtual stores. Meanwhile, recently hybrid stores are emerged which are combination of these two methods.

Manufacturers

This economic units are one of the other major elements of transaction cycle, because they manufacture an important part of what is transacted (goods and products). Based on different criteria this category of economical activities are divided into various groups and categories (from a small carpentry workshop to large multinational factories of automobile and domestic equipment).

It should be mentioned that both manufacturers and vendors of goods and services (specially stores and vendors), in addition to manufactured goods and their specifications, considering the main or ancillary services related to the goods and services and the customer satisfaction level are capable of being rated and ranked by the system. of course factories and large manufacturer units.

Of course about large industrial and manufacturing companies (like automobile and electronic equipment) and in some extent in medium and small units, this system can identify and separate completely or partially discrete manufacturing, transportation, sales and supplying and disposable services, that necessary planning has been done for members to rank each of these units based on customer opinion.

2-a) 'Purchasers of the Services

These group of members buy various services for taking advantage from vendor and supplier units through different financial transaction approaches. Vendor and supplier units and are classified as virtual (online) and actual units, and also they are classified based their field of activity and their location (for example, from a small inn to international hotels like Hilton or a Jackpot car to a casino in Las Vegas or a poker site . . . ).

b) The members of pays nothing as consumers and receivers of various services. These services are generally relate to governmental services and include most of the administrative, social, cultural, educational and even political affairs. The members of the system rank this type of service providers, their different services, various supplier division of these services (total to partial) and even responsible people in these units via designed facilities of system. By this manner they can rate them based on the satisfaction level of those who receive services.

2-manufacturer/suppliers and vendor of goods and services: MRSP manufacturer, suppliers and vendor of goods and services are units that provide the buyers and consumers (the members of the system) with various types of goods and services, and as mentioned before they have following classification:

1. Department stores: sell products and goods like supermarkets or restaurants . . . .
2. Service units: produce a service and offer it to be sold like pools and sport complexes, medical units, clubs and so on.
3. Manufacturing units: Include small dimension like carpeting workshops to huge companies like automobile and domestic factories. These units produce different and various goods and products.
4. Private and public divisions: Private division include units like above mentioned ones which financially communicate with its member, while public division has financial relations as well as buying and selling products and in some cases the citizens (potential members of CSSS) are provided with free and non-profit services based on the laws of each country or state. In CSSS system, for rating each unit, unique approaches are proposed.
3. financial transactions, payment systems and respective institutions: One of the innovations of the CSSS is adding customer survey and ranking system (CRS) to different payment systems for receiving customer satisfaction ranking at point-of-sale in the location of vendors and suppliers of goods and services which are supported by this system, which is a new advantage that can be added to these systems. Also it can be considered an advantage for CSSS system regarding the innovation in accelerating and facilitating the attraction and reception of satisfaction level and customer feedback at point-of sale.

4. Goods and services (what is transactioned)

4-A-goods:

Due to the fact that goods are consumed after being purchased (sometimes even after a year), receiving CSR in point-of-sale would not be applied to them. Therefore, the focus would be on CSR his or her feedback after purchasing. As goods are divided into different types and categories and can turn to edible, capital, durable goods and commodities, the executive method for ranking them and calculating their ranks in different categories are different to some extent, however CSR will be done through entering the CSR rank after sale and in on-line approach.

4-b-services:

Services have an extended range which can be divided and classified from different perspectives. For example, real services, virtual services, services at point-of-sale and local services. Due to the fact that many of the services are offered at point-of-sale, the consumer/customer is in the location after receiving the service and can enter his or her satisfaction rate during financial transaction and payment using CSR reception method accompanied by cash payment or without it through CSR announcing method in contact locations without financial transaction or after receiving the services.

Generally this invention comprises two parts which are in complete interaction and communication with each other. Customer Satisfaction System and Customer Satisfaction Network in fact has overlapped some parts from each other and operation of each of them depends on the operation of the other one. CSS system is a comprehensive system for receiving the customer satisfaction rank on different cases related to other elements of goods and services transaction cycle, such as vendors/manufactures and suppliers of goods and services (MRSP) and various types of goods and services in this cycle and also services related to equipment, financial transaction services and institutions who supply these financial transactions in contact/sale/buy points after that in determined time periods and completely without any possibility for prejudice and bias and manipulation. These opinions and rankings (CSR), clear summarization and calculation of rankings of customer satisfaction from each sales and supply unit of goods and services or any received goods or services from them based on various cases (price, quality, . . . ) and also provider tools of financial transaction service and also the provider unit of these units from different aspects and saving all of this respective data in databases for the use of CSN.

CSSN:

CSSN is a network including all the factors, units, components involved in CSS system and inputs and outputs of CSS for suitable communication between all of these elements for necessary data interactions and transaction, and offering all of different ranks in relation to each of the factors and units involved in the system and network based on different cases, providing and setting different lists about their factors and performances and distribution of respective rankings based on different criteria and different modes.

In other words, CSS system acts as various internal organs and elements of this complex and CSSN is as external organ of this complex which is observable and tangible. Obviously, the activity and health of this external organ depend on the health and proper function of each of these organs and also proper, fast and secure data transaction and communication between these two organs which should be free from bias, prejudice, manipulation and fraud.

Entering the Data the Quad Elements of Goods and Services into the Network

Generally primary data related to these quad elements and the request for registering these data in the network can be delivered to the network in different ways, for example for the members, this will be done through referring to the facilitating financial transaction institutions involved in the network or proceeding for the services of these institutions that to their facilities network membership has been added and filling out the respective forms (the mobile payment service, and receiving the credit card and . . . ) or print membership application form receipt from the available areas (such as post offices) and delivering it to the network mailing address etc. For other elements, data recording applications would be possible through resembling approaches. Undoubtedly, for financial institutions the measures will be taken through contacts and respective issues (also for recording the data related to the goods, necessary details have been described in appropriate part).

However, all the data related to these elements are finally to be input to the servers of network as off-line or on-line, with or without mediation (for review and approval) stored in data bases.

Member Registration

Network members will receive a unique identification code through inputting the data to the system. This code that corresponds to member's profile and data is saved to this system and will be applied in all of its procedures. Basic information such as Personally Identifiable Information—PII, contact information and all the required information, needed for member registration depend on the implementation location of the system. Further, for confirming the identity of the membership applicant and preventing the possibility of fraud and infringement, a verifiable ID (such as a driving license number, national code or passport number and etc.) is necessary and the membership would not be certain and complete. As this information is completed, the applicant will determine his/her requested membership level. The applicant will be provided with the membership level regarding usable or requested geographic area (urban, provisional and international), or usable or offered ancillary facilities and services in the network which is selected according to the member's application or based on the member ranking.

After entering the applicant's basic information and his identity confirmation by the respective part in the network, the member can enter his/her homepage. The member will be provided with extended facilities in this page, such as creation of desired changes in many of the peculiarities of his/her page (customize) like background colors, page components, font size and fonts, removing and adding all types of links, search boxes and etc in the context or task bar and many other services and facilities presented under the options and requirements entry and also main and ancillary services that to their headings is mentioned in the network for the members.

In general, the member's private pache is the main way for the member to communicate with different parts of the network and system's data based on his or her own membership level and the allowed access range considered for the members by the system.

Main and Ancillary Services and Facilities Offered by the System and the Network for the Members Different services and facilities are offered or disposable in the private page.

The Main Facilities Related to the Network and the System

1. Members Information Access Control

The network member controls the range of information to which other members can access based on several criteria and standards and he or she chooses access control list from among respective control list groups. These access ranges varies based on the type of the access applicants and type of information available to them.

For example the range of access to the member's information can differ based on the type of access applicants like manufacturers (ranked products), marketers of different products, management and complaints unit of different stores, different types of survey systems, advertisements, state and official inspection agencies (about ranked public and state services), market research and evaluation team, census unit or none of them.

Further the member can define access range for other members in the intergroup network membership. Likewise, the member can select the access range and type in the following levels: full access, access through nickname (which can be applied by the member for the company in the member's internal and intergroup network), access through e-mail and real name, access to the e-mail address and phone number with full name, access to facebook address, mobile number, access to all of the information without real name, unlimited access and no access.

This capability can be extended and cover larger number of your control lists In a way that for any of the network elements (financial institutions, manufactures or importers of goods and services, or each category of them, such as shop keepers, trades, manufacturers of special products or M-payment providers, or any unit involved in the system based on criteria and various standards like geographic location, type and level of special services which is considered for the members (for system receivers), the customer satisfaction ranking range of that unit/units (ACSR) in a determined time period, the cost range of goods, or services of that unit/units or units out of the network (market researchers and marketers or importers of special goods and services) or guarantee units of special goods in a way that different and combinatory access levels can be created.

For example, downloadable and observable information of a network member can be limited to the following information for marketers of a chocolate factory: The nickname, the purchase amount of chocolate in last year, and offered ranks granted to their different categories (milk, filled, bitter, . . . ) and the average payment for chocolates during this period and also his or her gender, age and education level.

Also the Members Access Control List is determined in the same way, except in members access control list some criteria such as gender, age, education level, membership level, membership level, overlap percentage of consumption behaviors in different fields such as (cultural, recreational, nutritional, technologic and so on) or cases such as common interests and all the areas that are generally discussed in communicative and social networks . . . are considerable and eligible.

Indeed, this way of defining the access level is one of the general network facilities for regular, reliable and documented creation, formation and organization of all the activities, relations and interactions between different parts of good and service circulation which is situated in different spaces such as network of internetwork communications, 3D virtual world, trading market of goods and services and online offering services, 3D virtual shopping center, second-handed trading market of goods and equipment, barter marketplace of career center and in fact in all the financial, economical, sport, recreational, social, cultural and educational activities that network members are interacting with each other or all the other people outside the network (as registered guests), based on aforementioned criteria for different member groups or individual groups. Customer Satisfaction System Acceptors (CSSA) Registration:

Considering the diversity and wide range of the acceptor of CSSA system, their information will be received and registered through different and various ways.

Further, needed documents, the way of signing contract or agreement related to the registration of vendor and manufacture/service units of the applicant who wants to enter the CSSN system can vary depending on the location (country, state, . . . ) and the approach of administrating the invention, which would not be discussed in here.

Therefore, we will focus on general requirements and specifications for each category of CSSA:

1. Goods and service providers or: vendor/service provider general information for entering the network for vendors of goods and suppliers of services are almost similar and is as the following:

Information related to the applicant including general and basic information related to the applicant: such as name, address, contact information: (telephone/fax/email, . . . ) and the applicant authority position.

Data related to the sales/supply location of goods and services:

This includes the data such as name, geographical location, extension/branches.

Address and contact information (telephone, fax/email, . . . ), location type and facilities available in the location (considering the building type, parking, children playground) data related to the a field of activity and type of offered goods & services:

General field of activity (store/service)

General type of the goods/products or service/services) and their classification (subcategories/details)

Data related to the services of special customers type/types of service/program/rewards considered for customers.

Quantity/quality/conditions for granting these rewards/services

The information related to the financial transaction approach applied in the unit.

In this part, there is some information for investigating with the possibility of coordinating and using facilities (CSSA) for applying the CSS system and establishing service/services for financial transactions in accordance with the requirements of CSSN network in the location of the respective CSSA.

Registration and submission of this information after inputting this data and pressing the submit button, if the input data of the applicant corresponds to the previous investigations of the network, (if necessary measures have already been taken)—for example through sending the application print by mail or reference of the network members to the location and receiving the data and its location and specifications) or studying the issues and corresponding this information to the reality, laws and principles of the network and also installing necessary equipment and preparing mentioned or service centers for starting the activity in the CSSN, the possibility of allocating the main acception code of system and entering the homepage of acception, will be provided.

Main and ancillary facilities and requirements offered by the customer satisfaction system and network for its receptors.

1. Opting Capacity of CSSA Code:

In the system, based on the circumstances of the acceptor unit such as geographical and locational situation, the field of activity & type of offered goods or services in that unit and also dependence & independence of the unit (whether the unit, is a branch of larger domestic, provintial, state or international complex or not and so on, a range of acception codes which are able to be assigned to the acceptor which will be selected and allocated by referring to the respective search box.

2. Development of the Information Related to the Acceptor.

The Unit (vendor unit of goods and supply unit of services) after certain registration of the unit and allocation of the related code to that and all the information related to the receptor unit have to be developed and completed to the extent required by the network.

Management/Ownership of the Unit:

In this part, the information related to the owner or manager or both of them and about larger units that have more branches and representatives and generally management and even geographical divisions, the data related to the management level and responsibility related to each unit of these divisions (geographical and management divisions) should be entered hierarchically if the intended unit is a component of a larger complex and in fact a subcategory of it, then, depending on the communication type and internal principles of this complex or entering to the CSSN network may be done from higher levels of the organization or complex and the measures for submission of this plural complex is decided on the behalf of the manager of the whole complex, and then will be imparted to the subset units; so necessary measures for registering each unit and assigning the related code will be done through central unit 2) or if the applicant unit acts as a subset unit of a complex or a brand, but in management and decision makings acts as an independent unit (based on geographical, managing divisions or state laws and principles, . . . ), so (based on the management decisions or an overall policy of the network administrative (CSSN) a completely independent or a code which is superficially independent but is defined as inactive, or is possible to be annexed the management or ownership of the unit to the owner of the international brand and management complex.

Definition of subsets and developing the data and assigning respective codes:

1—Branches/Representatives

If a complex of separate units (geographical division), is considered under the general management and a same brand as the receptor of the network (branch), all the data will be submitted under the name (branch/representative and . . . central unit) and all the data related to the of main unit will be defined and entered the system, and this will be defined through assigning the code as a subset of the main unit code (indeed, all data is submitted as an independent unit, however the information will be reflexed in the larger unit and the link connecting to the homepage will become active.)

3. Different Parts of a Unit

Some receptive units offer various types of products and goods or services in a complex (those which are geographically at the same area) or even a combination of goods and services.

For example in a shopping center, different goods are offered (such as the sales unit of protein products, clothing, or appliances) or in a sport or recreational complex various types of services are offered. Sometimes, a complex may serve both sale and service activities, for instance there may be a buffet for offering edible products or some places for providing different products (such as sport, and musical products or books), in this way some codes can be selected, created or assigned for each unit considering the activity type and properties of the services or products which are provided.

4. User Level of (in the Network)

Acceptor can determine or change their user level for receiving or using facilities of the network.

The CSSN network is able to (has to) provide all of the units related to a category/group/classification of trades or comparable and competitive fields of activity—as the standard range of network facilities for that group, trade or field of activity with a determined range of network facilities and capabilities.

Apparently, receiving more facilities and capabilities in the network may entail higher costs or achieving privileged ratings in relation to CSR and other competitive fields among their teammates in CSSN network. This can be true for all the other components and elements of the network (like members, . . . ).

5. The Data Related to Ranking the Units Based on Members Ranking (Acceptors Ranking History Based on CS Ratings)

In this part, the manager/owner of the acceptor unit of the system can observe all the received rankings (SCR) in different time periods and time intervals and receive respective diagrams and reports (considering the level of acceptor's unit in the network and also basic defined access restrictions in the system and also access settings of the members . . . ). These diagrams and reports can compare and study the satisfaction rankings and level of the unit in different time intervals, and about the units having subsets, branches, . . . the ranking and position of each subset part or unit. Other distinctive reports can be obtained based on different issues and depending on the user level of the unit (in higher levels).

For instance: Customer satisfaction (network members) curves/tables/diagrams can be compared in relation to each unit/part and branch of the acceptor unit subset and in relation to the location of the distinctive units or any group of products/services or any offered single product/service or in any relation to comparison of each of these options, gender, age, education, background, membership level, the number of rankings, the purchase level and placement position (geographical dispersion) of each group of network members that refer to the unit in the determined time interval.

Special Services for CSSA Customers

In this part based on the field and type of activity, acceptor defines the program/reward/service for the network members who provide their required goods or services from a service or vendor unit belonged to the acceptor. Indeed, this special service acts as a customer loyalty program or a marketing method. like many of the other parts of the system, variety of facilities can be selected and combined for determining different type/types of special services, for groups and eligible levels of members (customers) based on distinctive settings.

In other words, the acceptor can select a wide range of gifts, prizes, points, discounts, coupons, . . . separately or combinatory as its proposed special service based on the number of times/amount/price/diversity/payment means/type of the product or received services as single or categorical, time/location (for the units having branch or subset), customer rating or presenting the customer feedback during the purchase or after that and also based on some information of the customer specification (member) who has purchased from the acceptor unit such as age, sex, geographical location, membership level, the purchase amount or consumption of similar products and services generally (also from other acceptors) and, . . . based on the reports and information which are received from the data and statics center of the network.

The Data Related to the Financial Transactions of the Acceptor

In this part the data related to the financial transaction facilities application in the acceptor unit, more detailed data about each of them (the data related to the acceptor to which it is connected such as bank account related to it, to which the funds resulted from the selling of the goods or services is payed thereby) or the defined plans and special installed devices (hardware and software) for any transaction means. For instance POS machine installed in CSSN network stores has to be equipped with a broad scanner for receiving the code of purchased goods. These financial transaction tools can be combined with other devices and make a new device having more facilities. For example some of them from a hypermarket checkout counter (such as cashdesk, cash drawer, cash register, broad scanner, . . . ) and establish more facilities depending on the location of the acceptor unit (from the geographical point of view).

Due to the fact that an transaction is done between the two parties, vendor and buyer, they needed to be coordinated with each other to trade and circulate the data relevant to the CSSNnetwork. About this, it can be said that the acceptor party (vendor) for receiving the funds of its offered goods or services uses POS terminal payment stores and the customer or member uses one of the bank cards (debit, stored-value card-smart credit card-credit card). in the unit related to the description of the method of entering the CSSN network and the data related to these systems and devices are going to be explained.

3. The Third Component of Goods and Services Transaction Cycle:

Goods and services are the third part and in some way the basis and axis of transaction goods or services. because other elements are become meaningful by the existence of these elements. And in fact they are defined with this element. Various goods and services are defined in the system through commodity/product/goods code and service codes. so any goods or service in the CSSN network can be defined, rated or tracked.

The Code of the Goods:

For coding goods and services (CPG, commodity/product/goods) there are many methods and principles. according to the nature of CSSN system and also depending on the method and location of execution and its implementation, one of the following methods are done:

1) considering the penetration and development of international coding system of goods or services such as GSI, CPC, HS, ISIC and so on the data basis of CSSN goods codes are available and according to the fact that this basis is combined with other codes necessary for identification of the tracking and correct activity of the system by entering the network and CSSN cycle, the CSSN coding unit can select the best way about any group and category of goods and services and also through comparison and proper study. So in many cases, there is no need to installation of new barcode label.

So even the product codes can be received from the same factory after the production and entered the data base of the system.

This method is used for buying packed products from the modern stores which their goods have barcode on them and draw cash from checkout point, or some types of data input like barcode scanners and payment systems such as store terminal devices or bank card reader which is connected to the computer or the store cash or checkweigher.

For these cases, the server act and the data related to these goods can be entered the main data base that in input part the goods codes of eligible and private page of network acceptor which can be attached to the accepting code of that unit or the part/subset or the sales person related to that goods in the accepting code of the system. Also, the system and even the personnel on the behalf of the communicative terminal of the acceptor with the network, can open (network website/the private page of the acceptor and input part/subset and select the code of the intended product from among the possible options which are defined by the site or define and create them in the framework established by the site.

2-1—For the places in which technologic infrastructures are not totally prepared, for goods and products to which no code or username has been assigned, by observing general principles, codes and usernames can be created for being corresponded with the products from the system data base. This can be implemented in a store, a complex of stores with a same brand, different stores in an region, district, city, province or the country. So the data related to the code of a product is mostly related to the supplier and vendor of that product and may not be related to their producer.

3-1. If the CSSN network has developed properly for being corresponded to all types of technical infrastructures and structures existing in different locations in which CSSN is executed and related networks are created, a combination of these two models will be effective and proper. So, the coding unit of the network can use international barcodes and standards of the products according to the existing standards, and enter the data related to them as well as ancillary facilities (like the data related to production, technical points, electronic catalogues, . . . ). For the products that are not packed, or do not have verifiable barcode, serial number or ID—these goods are almost food products or commodities which are purchased in terms of their number or weight.

2-3-CSSS Code 2-3-1. If the intended service unit or the complex is developed based on divisions and disposable services in each of these parts, the identification code should be defined in the system for these services and specifically for a combination of both units (if any). As mentioned before, it can act through the acceptor page and the part related to the goods and services which are the subset of the smallest part of that unit and offer some goods, we can enter specifications and codes of that service into the respective parts, according to the principles. For example some parts of a service unit that offer some kinds of products, like a car repair shop which has spare part store.

4. The Forth Element of Transaction Cycle of Goods and Services—Financial Transactions, Payment Systems and Respective Institutes:

Today in many of the regions, almost all the areas, the financial transactions, specifically for buying trading goods and services and daily usage are done electronically Electronic Financial Transaction For this to be achieved, firstly a concept like electronic money should be created and realized and consumers of goods and services have to be provided with electronic money. secondly, some arrangements are to be created for spending and receiving this money at point of sale.

Due to the fact that people's money and capitals are generally in the banks, and banks are responsible for establishment and maintenance of all the monetary affairs, either they themselves take the action and establish some institutes for lunching the payment, reception and transaction of electronic money as their subset or establish some institutes specific to these affairs (payment service providers)

However, the reference of electronic money issuance (as the nature but not the form) are banks that are having people deposits, and also other institutes create some tools and approaches for their practical usage and facilitating for transactions. In CSS system, these methods and approaches as well as data transformation related to the interactions between the customer (member) and acceptor—which is their main responsibility, are responsible for the transactions related to the system about that interaction. (the data such as CSR, customer satisfaction rate, the code of the transacted goods and services)

Due to this reason, establishment of one of these institutes and administrating the approaches related to the financial transactions with facilities of the CSS system and creation of the CSSN based on it or adding these facilities to the existing facilities in one of them, is one of the approaches of this invention. for adding the facilities of this system to the electronic transaction transactions generally, the following measures should be taken:

1. The data related to the customer should be received as the services are used by him:
2. The data related to his CSR as well as the money related to the purchase should be taken.
3. The data related to his purchase should be taken (bought goods or services)
4. The data related to the vendor/supplier of goods or services or mentioned service (the ID of the acceptor and the member special service, . . . )
5. The data related to the financial transaction as well as all the other data are combined with each other and form a CSS central transaction data string).

By these specifications, different types of payment system services and also different types of payment cards and other modes of payments like mobile payment/ on-line and internet payment won't have many differences, and by creating some changes such as changing the switch or the software, and designing the POS, checkout devices or new approaches of payment M-payment and . . . ) it can be used in many systems.

In view of the foregoing, it will be appreciated that present invention provides significant improvements in customer satisfaction systems. It should be understood that the foregoing relates only to the exemplary embodiments of the present invention, and that numerous changes may be made therein without departing from the spirit and scope of the invention as defined by the following claims.

What is claimed:

1. A customer satisfaction system comprising:
a server and a plurality of customer satisfaction rating terminals:
the server configured to store and access member services including member registration information, member feedback, member savings accounts and a membership directory;
the server configured to store and access vendor services including vendor registration information, vendor data files, vendor inventory and price lists, and vendor comparisons;
the server and the plurality of customer satisfaction rating terminals configured to execute a member directory component including a geographic area hierarchy that includes neighborhood granularity, a product or service category hierarchy, a shopping venue type hierarchy that classifies the shopping venue type, a price range hierarchy and member discounts component that provides implementation of discounts and rewards offered by participating vendors and a ratings component;
the plurality of customer satisfaction rating terminals configured to receive-customer satisfaction feedback from customers regarding a plurality registered vendors, wherein the plurality of customer satisfaction rating terminals comprise a plurality of point-of-sale terminals, wherein each of the plurality of point-of-sale terminals is assigned to a particular vendor, each of the plurality of point-of-sale terminals is located on the premises of the vendor in association with a purchase checkout station, and configured to receive customer satisfaction feedback in the form of customer satisfaction ratings entered at the time that the customer pays for a purchase while the customers are located at the checkout station;
wherein the system further comprises at least one of a plurality of post-sale customer feedback stations or search engine portals configured to receive via the server, more detailed customer feedback after the purchase has been completed from locations other than the point-of-sale locations;
a customer satisfaction aggregation system configured to receive the customer satisfaction feedback from the each of the plurality of point-of-sale terminals and the post-sale customer feedback stations customer satisfaction rating terminals and consolidating the customer satisfaction feedback to provide an aggregate customer satisfaction rating for each registered vendor;
a customer satisfaction dissemination system operable that provides access to a customer satisfaction qualified vendor directory containing a plurality of vendor entries, wherein each vendor entry contains contact information and the aggregate customer satisfaction rating determined by the customer satisfaction aggregation system for the associated vendor; and
wherein the customer satisfaction qualified vendor directory is organized and searchable by geographic location of the plurality of registered vendors, and for each geographic location contains vendor entries organized and searchable by category of product or service offered by the vendors.

\* \* \* \* \*